(12) United States Patent
Cramer et al.

(10) Patent No.: US 6,863,933 B2
(45) Date of Patent: Mar. 8, 2005

(54) METHOD OF HYDROPHILIZING MATERIALS

(75) Inventors: Ronald Dean Cramer, Cincinnati, OH (US); Robert Henry Rohrbaugh, Hamilton, OH (US); John David Carter, Mason, OH (US); Karl Edward Thuemmler, West Chester, OH (US); Ekaterina Anatolyevna Ponomarenko, Schwalbach am Taunus (DE); Mattias Schmidt, Idstein (DE)

(73) Assignee: The Procter and Gamble Company, Cincinnati, OH (US)

( * ) Notice: Subject to any disclaimer, the term of this patent is extended or adjusted under 35 U.S.C. 154(b) by 164 days.

(21) Appl. No.: 10/060,694

(22) Filed: Jan. 30, 2002

(65) Prior Publication Data

US 2002/0192366 A1 Dec. 19, 2002

Related U.S. Application Data

(60) Provisional application No. 60/265,013, filed on Jan. 30, 2001.

(51) Int. Cl.[7] .............................. B05D 3/06; H05H 1/52; H05H 1/24; C08J 7/06; C23C 14/02
(52) U.S. Cl. ...................... 427/533; 427/535; 427/536; 427/538; 427/540; 427/551; 427/553; 427/554; 427/180
(58) Field of Search ................................. 427/533, 534, 427/535, 536, 538, 539, 540, 551, 552, 553, 554, 557, 180

(56) References Cited

U.S. PATENT DOCUMENTS

| | | |
|---|---|---|
| 2,695,002 A | 11/1954 | Miller |
| 2,989,241 A | 6/1961 | Badger |
| 3,594,212 A | 7/1971 | Ditsch |

(List continued on next page.)

FOREIGN PATENT DOCUMENTS

| | | |
|---|---|---|
| EP | 0 637 616 B1 | 2/1995 |
| EP | 0 753 567 A1 | 1/1997 |
| EP | 1 090 893 A1 | 4/2001 |
| JP | 1994172657 A | 6/1994 |
| JP | 1998212809 A | 8/1998 |
| JP | 1998-237431 A | 9/1998 |
| JP | 1998297436 A | 11/1998 |
| JP | 1999172239 A | 6/1999 |
| JP | 1999181339 A | 7/1999 |
| JP | 1999300303 A | 11/1999 |
| JP | 2000096800 A | 4/2000 |
| WO | WO 01/032820 A1 | 5/2001 |
| WO | WO 01/44425 A1 | 6/2001 |
| WO | WO 01/44561 A1 | 6/2001 |
| WO | WO 01/83662 A1 | 11/2001 |

*Primary Examiner*—Marianne Padgett
(74) *Attorney, Agent, or Firm*—Eric T. Addington; Dara M. Kendall; Ken K. Patel

(57) ABSTRACT

Coating compositions, methods and articles of manufacture comprising a nanoparticle system employing same to impart surface modifying benefits for all types of soft surfaces, and in some cases, hard surfaces, are disclosed. In some embodiments, dispersement of nanoparticles in a suitable carrier medium allows for the creation of coating compositions, methods and articles of manufacture that create multi-use benefits to the modified surfaces. These surface modifications can produce long lasting or semi-permanent multi-use benefits that, in some embodiments, may include at least one of the following improved surface properties: cleaning, wettability, liquid strike-through, comfort, stain resistance, soil removal, malodor control, modification of surface friction, reduced damage to abrasion and color enhancement, relative to the surfaces unmodified with such nanoparticle systems.

13 Claims, 1 Drawing Sheet

U.S. PATENT DOCUMENTS

| | | | | |
|---|---|---|---|---|
| 3,660,142 A | * | 5/1972 | Kasugai et al. | |
| 3,716,488 A | | 2/1973 | Kolsky et al. | |
| 3,736,259 A | | 5/1973 | Buck et al. | |
| 3,862,058 A | | 1/1975 | Nirschi et al. | |
| 3,886,075 A | | 5/1975 | Bemardino | |
| 3,954,632 A | | 5/1976 | Gloss | |
| 3,962,100 A | | 6/1976 | Murphy et al. | |
| 3,989,631 A | | 11/1976 | Marsan | |
| 4,035,148 A | | 7/1977 | Metzger et al. | |
| 4,090,974 A | | 5/1978 | Morganson | |
| 4,128,426 A | * | 12/1978 | Ohta et al. | |
| 4,178,254 A | | 12/1979 | Leikhim et al. | |
| 4,566,980 A | | 1/1986 | Smith | |
| 4,581,385 A | | 4/1986 | Smith et al. | |
| 4,601,911 A | * | 7/1986 | Ueno et al. | |
| 4,752,034 A | | 6/1988 | Kuhn et al. | |
| 4,806,253 A | | 2/1989 | Burckett St. Laurent et al. | |
| 4,844,824 A | | 7/1989 | Mermelstein et al. | |
| 4,873,000 A | | 10/1989 | Weller | |
| 4,885,101 A | | 12/1989 | Tai | |
| 4,962,885 A | | 10/1990 | Coffee | |
| 5,004,556 A | | 4/1991 | Julemont et al. | |
| 5,019,292 A | | 5/1991 | Baeck et al. | |
| 5,073,404 A | * | 12/1991 | Huang | |
| 5,209,857 A | | 5/1993 | Kenyon et al. | |
| 5,222,664 A | | 6/1993 | Noakes et al. | |
| 5,405,090 A | | 4/1995 | Greene et al. | |
| 5,576,282 A | | 11/1996 | Miracle et al. | |
| 5,646,101 A | | 7/1997 | MacBeath | |
| 5,686,014 A | | 11/1997 | Baillely et al. | |
| 5,695,679 A | | 12/1997 | Christie et al. | |
| 5,698,504 A | | 12/1997 | Christie et al. | |
| 5,705,464 A | | 1/1998 | Scheper et al. | |
| 5,707,950 A | | 1/1998 | Kasturi et al. | |
| 5,710,115 A | | 1/1998 | Patel et al. | |
| 5,721,205 A | | 2/1998 | Barnabas et al. | |
| 5,837,041 A | * | 11/1998 | Bean et al. | 106/31.6 |
| 5,945,175 A | * | 8/1999 | Yahiaoui et al. | 427/534 |
| 6,013,372 A | | 1/2000 | Hayakawa et al. | |
| 6,045,969 A | * | 4/2000 | Verschueren et al. | 427/536 |
| 6,337,129 B1 | | 1/2002 | Watanabe et al. | |
| 6,602,812 B1 | * | 8/2003 | Onodera et al. | 442/327 |
| 6,641,569 B1 | * | 11/2003 | Coles et al. | 604/385.19 |
| 6,645,569 B2 | * | 11/2003 | Cramer et al. | 427/466 |
| 2002/0150678 A1 | * | 10/2002 | Cramer et al. | 427/212 |
| 2003/0148684 A1 | * | 8/2003 | Cramer et al. | 442/118 |
| 2004/0127123 A1 | * | 7/2004 | Jordan et al. | 442/76 |
| 2004/0167486 A1 | * | 8/2004 | Busam et al. | 604/367 |

* cited by examiner

METHOD OF HYDROPHILIZING MATERIALS

CROSS REFERENCE TO RELATED APPLICATIONS

This application claims the benefit of the filing date of U.S. Provisional patent application Ser. No. 60/265,013 filed Jan. 30, 2001.

FIELD OF THE INVENTION

The present invention relates to coating compositions, methods and articles of manufacture comprising a nanoparticle system or employing same to impart surface modifying benefits for all types of soft surfaces, and in some cases, hard surfaces.

BACKGROUND OF THE INVENTION

Inorganic particulates, such as, clays, silicates, and alumina have been widely used in combination with adjunct detergent and laundry compounds to impart some form of antistatic control and/or fabric softening benefit.

One approach taken in the prior art discloses anti-static benefits using inorganic particulates. Patents describing such uses include U.S. Pat. Nos. 3,594,212 and 3,862,058.

The benefit of fabric softening is widely disclosed in the prior art. Patents describing such uses include: U.S. Pat. Nos. 3,886,075; 4,806,253; 4,885,101; 5,004,556; 5,019,292; 5,209,857; and 5,721,205.

It is generally well known that inorganic particulates can be used in the cleaning, freshening and deodorizing of certain types of textiles, such as carpets. See, for example, U.S. Pat. No. 3,716,488 (Stevens J & Co); U.S. Pat. No. 3,736,259 (Colgate Pomalive); U.S. Pat. No. 4,035,148 (P&G); U.S. Pat. No. 4,090,974 (FMC); U.S. Pat. No. 4,566,980 (Creative Products); U.S. Pat. Nos. 4,581,385. and 4,873,000 (Sterling Drug). In practice, the clays used in these cleaning compositions have particle sizes between 10–60 µm (10,000–60,000 nanometers).

Other patents and patent publications include: U.S. Pat. No. 3,936,537 (P&G 1976); U.S. Pat. No. 3,954,632 (P&G 1976); U.S. Pat. No. 3,962,100 (P&G 1976); U.S. Pat. No. 3,989,631 (P&G 1976); U.S. Pat. No. 4,178,254 (P&G 1979); U.S. Pat. No. 4,844,824 (P&G 1989); U.S. Pat. No. 5,209,857 (Lever 1993); JP6172657 (Nippon Shirika 1994); EP 753567 (P&G 1997); WO 01/32820 (Henkel 2001); WO 01/44425 (Lever 2001); WO 01/44561 (Lever 2001); and WO 01/83662 (Henkel 2001).

It is apparent that there is a need for methods for improving the properties of cloth or fabric materials containing various natural, man-made, and/or synthetic fibers. The hydrophobic nature of certain types of fibers, such as synthetic polyester or nylon, or the hydrophobic modification of fabrics due to "aging" of the material (e.g., cotton), give rise to a number of soft surface performance issues including: greater difficulty in removing hydrophobic soils (cleaning), greater attraction of soils from wash solutions (whiteness/ redeposition/stain resistance), greater retention of body soils (malodor), greater difficulty in color fading (color control) and lower ability to transport moisture through fabric (wettability and comfort). There is also a continuing need that these modified surface benefits be made longer lasting or semi-permanent in order to be more responsive to consumer applications.

SUMMARY OF THE INVENTION

The present invention relates to compositions, methods, and articles of manufacture comprising a nanoparticle system or employing the same that provide to impart surface modifying benefits for all types of soft surfaces, and in some cases, hard surfaces. In some embodiments, these benefits can be made long lasting or semi-permanent. These multi-use benefits may include one or more of the following: improved surface cleaning, wettability, strike-through, comfort, stain resistance, soil removal, malodor control, modification of surface friction, reduced damage to abrasion, and color enhancement properties relative to surfaces unmodified with such nanoparticle systems. There are numerous, non-limiting embodiments of the invention. All embodiments, even if they are only described as being "embodiments" of the invention, are intended to be non-limiting (that is, there may be other embodiments in addition to these), unless they are expressly described herein as limiting the scope of the invention.

In one non-limiting embodiment of the present invention there is provided a soft surface coating composition comprising: (a) an effective amount of nanoparticles; (b) optionally a surfactant; (c) optionally having associated with said nanoparticles one or more charged functionalized molecules exhibiting properties selected from the group consisting of hydrophilic, hydrophobic and mixtures thereof; (d) optionally one or more adjunct ingredients; and (e) a suitable carrier medium.

In another non-limiting embodiment, there is provided a method of using a coating composition for modifying a soft surface comprising the steps of: (a) applying the coating composition to the soft surface; and (b) allowing the coating composition to dry on the soft surface to form a coating on the soft surface; and (c) optionally repeating any of steps (a) and (b) as needed.

In another non-limiting embodiment, there is provided an article of manufacture comprising an applicator such as a spray dispenser, an immersion container, a hose spray dispenser attachment, a fabric and/or a sponge wherein the applicator contains (a) a coating composition according to the present invention, wherein the coating composition is in a physical form selected from the group consisting of liquid, liquid concentrate, gel, powder, tablet, granule and mixtures thereof; and (b) optionally a source of deionized water; (c) optionally a source of tap water, and (d) optionally a set of instructions in association with the applicator comprising an instruction to dispense the coating composition from said applicator onto the soft surface to modify the surface.

The use of a surface coating in modifying soft surfaces must not leave behind detectable residues (e.g., visible or odorous) that would be otherwise unacceptable to the consumer. The advantage of nanoparticle coatings over other types of surface modifying agents (e.g. film forming polymers) is that they can provide films on the surface that are essentially invisible. The proper nanoparticle coating composition may provide a transparent coating or the coating composition may also be selected to provide a unique color enhancement of textile surfaces. Color enhancement provides a rejuvenation of the color of faded or worn garments and textiles and/or the prevention of color loss. Alternatively, nanoparticles can be combined with delivery agents such as hydrophilic surface polymers to drive nanoparticle deposition and improve the longevity of the surface modification.

Substrates treated with the benefit agent materials (i.e., the nanoparticle systems) of the present invention, in various embodiments, may be made to exhibit a greater improvement in cleaning, wettability, strike-through (transport of moisture/liquids through such substrates), comfort, stain resistance, soil removal, malodor control, modification of surface friction, reduced damage to abrasion, and color enhancement properties compared to substrates not treated with such benefit agent materials.

These and other embodiments, objects, features and advantages will be clear from the following detailed description, examples and appended claims.

All percentages, ratios and proportions herein are on a weight basis based on a neat product unless otherwise indicated.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings, in which:

DETAILED DESCRIPTION OF THE INVENTION

Definitions

Figure 1:
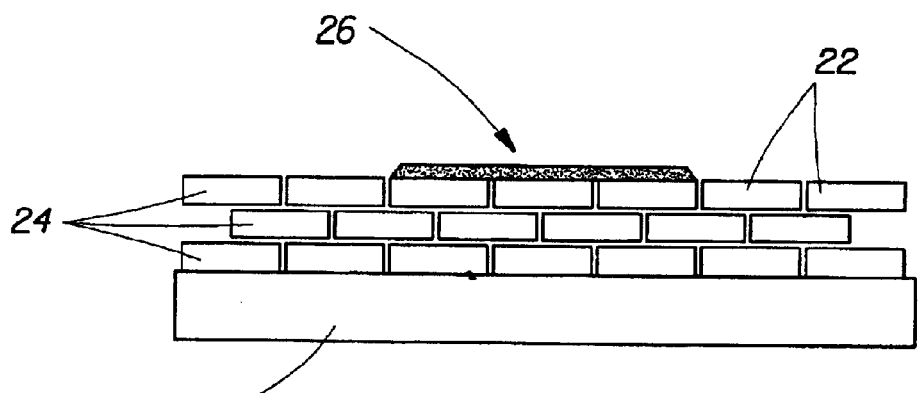
FIG. 1 is a schematic side view of a soft surface with several layers of nanoparticles that form a coating thereon, and soil on a portion of the nanoparticle coating.

The term "coating", as used herein, includes coatings that completely cover a surface, or portion thereof (e.g., continuous coatings, including those that form films on the surface), as well as coatings that may only partially cover a surface, such as those coatings that after drying leave gaps in coverage on a surface (e.g., discontinuous coatings). The later category of coatings may include, but is not limited to a network of covered and uncovered portions and distributions of nanoparticles on a surface which may have spaces between the nanoparticles. In some embodiments, the coating preferably forms at least one layer of nanoparticles on the surface which has been coated, and is substantially uniform. However, when the coatings described herein are described as being applied to a surface, it is understood that the coatings need not be applied to, or that they cover the entire surface. For instance, the coatings will be considered as being applied to a surface even if they are only applied to modify a portion of the surface.

Photoactive nanoparticles are nanoparticles that require UV or visible light to activate the coating whereby the coating becomes hydrophilic as presented in JP. Pat. No. 11181339 A2; JP. Pat. No. 11172239 A2; JP. Pat. No. 10297436 A2; JP. Pat. No. 10046759 A2; JP. Pat. No. 09056549 A2; JP. Pat. No. 00128672 A2; JP. Pat. No. 00096800 A2; JP. Pat. No. 11300303 A2; JP. Pat. No. 10237431 A2; JP. Pat. No. 10212809 A2; JP. Pat. No. 09230107 A2; and JP. Pat. No. 09228072 A2. The intensity of the UV or visible light required to achieve said activation is generally comparable to that of sun.

Soft Surfaces

The soft surfaces of interest herein may comprise any known type of soft surface, including but not limited to fabrics, garments, textiles, and films. In certain embodiments, the soft surface may comprise one or more fibers. A fiber is defined as a fine hairlike structure, of animal, vegetable, mineral, or synthetic origin. Commercially available fibers have diameters ranging from less than about 0.001 mm (about 0.00004 in) to more than about 0.2 mm (about 0.008 in) and they come in several different forms: short fibers (known as staple, or chopped), continuous single fibers (filaments or monofilaments), untwisted bundles of continuous filaments (tow), and twisted bundles of continuous filaments (yarn). Fibers are classified according to their origin, chemical structure, or both. They can be braided into ropes and cordage, made into felts (also called nonwovens or nonwoven fabrics), woven or knitted into textile fabrics, or, in the case of high-strength fibers, used as reinforcements in composites—that is, products made of two or more different materials.

The soft surfaces may comprise fibers made by nature (natural fibers), made by man (synthetic or man-made), or combinations thereof. Example natural fibers include but are not limited to: animal fibers such as wool, silk, fur, and hair; vegetable fibers such as cellulose, cotton, flax, linen, and hemp; and certain naturally occurring mineral fibers. Synthetic fibers can be derived from natural fibers or not. Example synthetic fibers which are derived from natural fibers include but are not limited to rayon and lyocell, both of which are derived from cellulose, a natural polysaccharide fiber. Synthetic fibers which are not derived from natural fibers can be derived from other natural sources or from mineral sources. Example synthetic fibers derived from natural sources include but are not limited to polysaccharides such as starch. Example fibers from mineral sources include but are not limited to polyolefin fibers such as polypropylene and polyethylene fibers, which are derived from petroleum, and silicate fibers such as glass and asbestos. Synthetic fibers are commonly formed, when possible, by fluid handling processes (e.g., extruding, drawing, or spinning a fluid such as a resin or a solution). Synthetic fibers are also formed by solid handling size reduction processes (e.g., mechanical chopping or cutting of a larger object such as a monolith, a film, or a fabric).

Independent of origin, many synthetic fibers are now derived from organic polymeric materials and are comprised of large organic macromolecules. Polymeric macromolecules comprise a plurality of one or more type of repeat units. Repeat units result from monomers reacting to form chains, or strands, of repeating units. Polyolefin macromolecular strands are formed by addition polymerization reaction. Most other macromolecular strands are formed by condensation polymerization reactions. Individual strands can optionally have branch strands or not. Individual strands often have varying degrees of order ranging from crystalline regions to amorphous regions. The macromolecules in a fiber can be thermoplastic or thermoset. Thermoplastic fibers can be softened by heat to the point of flow between macromolecule strands at a pressure prior to reaching a decomposition temperature. Thermoset fibers, typically associated with crosslinking of macromolecule strands, may soften with heat but cannot be softened to the point of flow prior to reaching a decomposition temperature.

Many synthetic fibersare formed from one or more resins in which the macromolecular strands are preformed. Resins can optionally include one or more additives. Example additives include but are not limited to surfactants, colorants, solvents, and crosslinking agents such as free radical initiators. Resins are either thermoplastic or thermosetting. Fibers formed by thermosetting resins which flow before crosslinking can be crosslinked during or after fiber formation yielding the thermoset. Common synthetic fiber resins include but are not limited to nylon (polyamide), acrylic (polyacrylonitrile), aramid (aromatic polyamide), polyolefin (polyethylene and polypropylene), polyester, butadiene-stryene block copolymers, natural rubber, latex, and spandex (polyurethane). In the case of thermoplastic resins, the resins can be producer grade, reprocessed, or combinations thereof. When stereospecificity variations between adjacent repeat units are possible, care must be taken to select resins with stereospecificity which will yield the desired end use fiber properties. Care must also be taken to select resins with a molecular weight distribution which will yield the desired intermediate end use fiber properties. In a non-limiting example, high molecular weight isotactic polypropylene is a common resin choice for polypropylene fibers because the resultant fiber structure has many of the properties desired in various intermediate and end uses. Syndiotactic and atactic polypropylene yield different intermediate and end properties.

Synthetic fibers that contain more than one type of repeat unit can result from combining repeat units at the molecular level within each macromolecular strand (co-polymer), between macromolecular strands (homopolymer blends), or combinations thereof (co-polymer blends); or they can result from combining repeat units at a higher scale level with distinct nanoscopic, microscopic, or macroscopic phases (e.g., multicomponent fibers). Each component of a multicomponent fiber can comprise a homopolymer, a co-polymer, or blends thereof. Bicomponent fibers are common versions of multicomponent fibers. The two or more types of repeat units in a copolymer can be arranged randomly or in alternating blocks of each type. Blocks of different types of repeat units can joined to one another at their respective ends (block co-polymers) or between the repective end of at least one block (graft co-polymers).

Nonwoven materials are a type of fabric typically made from fibers in a web format. Nonwoven webs are described by Butler I, Batra S K, et al, *Nonwovens Fabrics Handbook, Association of the Nonwoven Fabrics Industry*, 1999, and by Vaughn E A, *Nonwoven Fabric Sampler and Technology Reference, Association of the Nonwoven Fabrics Industry*.

Nonwoven webs can be formed by direct extrusion processes during which the fibers and webs are formed at about the same point in time, or by preformed fibers which can be laid into webs at a distinctly subsequent point in time. Example direct extrusion processes include but are not limited to: spunbonding, meltblowing, solvent spinning, electrospinning, and combinations thereof typically forming layers. Example "laying" processes include wetlaying and drylaying. Example drylaying processes include but are not limited to airlaying, carding, and combinations thereof typically forming layers. Combinations of the above processes yield nonwovens commonly called hybrids or composites. Example combinations include but are not limited to spunbond-meltblown-spunbond (SMS), spunbond-carded (SC), spunbond-airlaid (SA), meltblown-airlaid (MA), and combinations thereof, typically in layers. Combinations which include direct extrusion can be combined at the about the same point in time as the direct extrusion process (e.g., spinform and coform for SA and MA), or at a subsequent point in time. In the above examples, one or more individual layers can be created by each process. For instance, SMS can mean a three layer, 'sms' web, a five layer 'ssmms' web, or any reasonable variation thereof wherein the lower case letters designate individual layers and the upper case letters designate the compilation of similar, adjacent layers.

The fibers in a nonwoven web are typically joined to one or more adjacent fibers at some of the overlapping junctions. This includes joining fibers within each layer and joining fibers between layers when there is more than one layer. Fibers can be joined by mechanical entanglement, by chemical bond or by combinations thereof.

Mechanical entanglement processes include said processes involving an intermediary, said processes not involving an intermediary, and combinations thereof. Wishing not to be bound by theory, the intermediary partially diffuses at a molecular level into the fiber surface it is joining (e.g., physisorption or van der Waals interaction), flows at a nano-, micro- or macroscopic level into surface irregularities or around fiber surface curvatures prior to becoming more rigid (or "solidifying"), or combinations thereof. The intermediary can take the form of a solvent which softens the fiber surfaces that then flows, the form of a fluid such as an adhesive which flows then solidifies, or of a solid such as thermoplastic binder fibers or particulates of which at least a portion flows during heating or pressure then resolidifies. A nonlimiting class of thermoplastic fiber binders are bicomponent fibers such as a polypropylene core surrounding by a lower melting point polyethylene sheath. A nonlimiting class of particulate binders are latex binders. Thermal or pressure bonding can cause the intermediary thermoplastic fiber or particulate binder to flow without causing the nonwoven fibers to necessarily flow to the same extent provided the nonwoven fibers, the binders, and the nonwoven process are designed for said flow (e.g., by selecting a lower melting point intermediary or a reduced thermal mass intermediary). Stitchbonding is another example of a mechanical entanglement process involving an intermediary in which threads are bound around fibers in a high speed loom joining fibers and layers. Mechanical entanglement processes which do not involve an intermediary include those processes which involve diffusion or flow of a portion of the fibers, such as part of the fiber surface, and processes which do not involve flow. Example mechanical entanglement processes, which do not involve an intermediary but which do involve flow, include but are not limited to certain thermal and pressure bonding processes. Wishing not to be bound by theory, during said thermal and pressure bonding processes, a portion of the surface of one fiber, either a single component or a multicomponent fiber, diffuses at a molecular level into the fiber surface it is joining (e.g., physisorption or van der Waals interaction), flows at a nano-, micro- or macroscopic level into surface irregularities or around fiber surface curvatures prior to becoming more rigid (or "solidifying"), or combinations thereof. Thermal bonding can be accomplished via conduction (e.g., thermal calendaring), convection (e.g,. hot air thru), radiant heat transfer, or combinations thereof. Example mechanical entanglement processes which do not involve an intermediary and which do not involve diffusion or flow of the fiber surface include but are not limited to needlepunching and, typically, hydroentanglement. During needlepunching and hydroentanglement, portions of the fibers themselves are bent or otherwise moved around the surface curvature of nearby fibers by mechanical forces imparted on the fibers by moving needles or water jets. Without wishing to be bound by theory, friction between fibers along their torturous paths provides sufficient force to maintain the entanglement thereafter.

Chemical bonding processes include processes involving an intermediary, processes not involving an intermediary, and combinations thereof. Chemical bonding processes typically proceed similar to certain mechanical entanglement processes with the exception that a chemical bond forms. The chemical bonds tend to range from covalent bonds (higher strength) to hydrogen bonds (lower strength). Wishing not to be bound by theory, the line between certain chemical bonds, or chemisorption, and certain mechanical entanglements, or physisorption, can be difficult at times to discern and typically is relatively unimportant for end use applications when the desired end use properties are obtained.

Fibers and nonwoven webs can be subjected to additional treatment after formation. For nonwoven webs, additional treatment commonly occurs after the fibers are joined to one another (post-treatment). Examples of additional treatments include but are not limited to mechanical stresses, chemical additives, or combinations thereof. Mechanical stresses can be exerted in the machine direction (MD), in the cross-machine direction (CD), in the cross-planar direction (z-direction), or combinations thereof. Mechanical stress approaches are well known in the art and include but are not limited to MD strain, CD strain, and z-direction perforation or cutting, all by a variety of techniques many of which can be applied to a portion of the web or to the entire web over various timeframes. Example mechanical post-treatments include but are not limited to activation, ring rolling, selfing, drawing, cutting, slicing, and punching.

Chemical additive approaches are well known in the art. Chemical additives can be applied around a portion of or around entire individual fibers, to one side of a web, or to both sides of a web by a variety of techniques many of which can apply chemical additives to a portion of the fibers or web, or to all fibers or to the entire web over various timeframes. Chemicals can be added from a solid phase, a liquid phase, a gaseous phase, or as the result of a high energy surface treatment such as irradiation, irradiative oxidation, or plasma treatment. High energy surface treatments can also be used to promote chemical changes of the material(s) on or near the fiber surface. A non-limiting example solid phase technique is sprinkling in which gas (air) acts as a dispersant between macroscopic particles as they fall. Another non-limiting solid phase example is an air stream which acts as a dispersant and which carries the macroscopic particles. In the air stream example, the air is the carrier medium. Example liquid phase techniques include but are not limited to spraying, immersion, transfer by one or more rollers such as a kiss roll, and transfer printing such as rotary, gravure, and flexographic printing. An example liquid phase additive is a surfactant to render the surface of hydrophobic fibers hydrophilic. Example high energy surface treatments include but are not limited to corona discharge treatment, plasma treatment, UV radiation treatment, ion beam treatment, electron beam treatment, and certain laser treatments including pulsed lasers. Additives or chemical changes on or near the fiber surface resulting from certain high energy surface treatments include but are not limited to the creation of ozone from atmospheric oxygen near the surface, the establishment of free radicals or electrons or other partial or fully charged species on the surface, and the crosslinking of candidate macromolecules in the surface. Macromolecules which are candidates for crosslinking typically have added functionality in their chain such as double bonds or branches containing hydroxyl groups.

A common limitation associated with most high energy surface treatments is durability, particularly on thermoplastic surfaces. The partial or full charges imparted on a thermoplastic surface by various high energy surface treatments tend to dissipate over time with half lives sometimes measured in days or weeks. Without wishing to be bound by any particular theory, one explanation of this phenomenon is the repulsion of the partial or full charges by atmospheric oxygen gas. Due to the surface mobility of most thermoplastic polymers, the partial or full charges can rotate into the interior of the polymer phase where they become hidden from and, thus, inaccessible to species contacting the surface.

The limitations associated with high energy surface treatments of fibers typically exceed the limitations for films of the same material, particularly but not limited to non-perforated films. Without wishing to be bound by any particular theory, a key distinction is the surface geometry. While films have a three dimensional surface topography at the nanoscopic level, films can be regarded, for the purposes of high energy surface treatment in comparison to fibers, as being approximately two dimensional at higher scales (length and width dominate thickness which only becomes relevant at edges). The three dimensional geometry of fibers, including fibrous fabrics, makes the thickness dimension more relevant than for films. In comparison to many films, the plurality of fibers creates a plurality of edges which constitute surface area. Furthermore, most fabrics have fiber surfaces which are not adjacent to an imaginary plane which can be drawn across the surface of the outermost fibers on either side of a fabric. Indeed, portions of said non-adjacent fiber surfaces can often be regarded as hidden zones. Getting high energy surface treatments or any resultant species created by a high energy surface treatment to partially or fully penetrate hidden zones is a limitation associated with most fibrous fabrics. Said limitation is sometimes called shadowing. In contrast, common films such as a non-perforated film comprised of the same material as a fibrous fabric, with surface area and nanoscale topography comparable to the fibrous surface area, has fewer hidden zones. When exposed to a comparable dose from a high energy surface treatment, a greater portion of the surface area of said film is thus exposed in comparison to said fibrous fabric. This typically yields a higher charge density on average for a film surface than for the surface of the fibers in a fabric. As the charge dissipates, the fibrous fabric limitations continue. The fibrous fabric has a greater surface area across which to dissipate the charge which is initially primarily located on the fiber surfaces facing outward. One non-limiting example compares film comprised of an isotactic polypropylene resin, which is approximately 1 meter long by 1 meter wide by 150 microns thick, to an isotactic polypropylene spunbond nonwoven, which is about 150 microns thick when measured between the imaginary plane which can be drawn across the surface of the outermost fibers on either side the nonwoven, in which the fibrous surface area is about the same as the surface area of said film. Said spunbond nonwoven has a greater number of hidden zones.

Nonwoven webs are typically much longer than they are wide and wider than they are thick. Nonwoven webs constitute end user products themselves or they constitute intermediate products that can be subsequently converted into other intermediate products and eventually into end user products. When stored as an intermediate product prior to conversion toward an end use application, nonwoven webs are commonly wound into rolls (rollstock) or are festooned into bundles.

Nonwoven webs are commonly joined with other nonwoven webs or films forming composite webs. These webs can be joined in ways previously described and are commonly called laminates. A non-limiting example laminate is a disposable absorbent product backsheet such as a diaper backsheet in which a nonwoven is joined to a film such as a microporous film. Width variations of various layers in a laminate yield complex webs. An absorbent product web prior to being cut into individual segments, typically into finished product segments, is an example of a laminate web and, typically, of a complex web.

Acoustical and thermal performance, tensile and bursting strength, dimensional stability, stiffness, resiliency, drape, softness, fluid transport or repellancy, abrasion resistance, static charge, and other web characteristics which are important for intermediate and end products under conditions is established during the manufacturing process. Molded fiber products provide the design engineer with greater latitude in designing acoustical insulators, which possess variable thickness, densities and surface conformance to mating shapes, thus improving fit and finish and ease of installation. Molded fiber products are manufactured in a wide range of weights, densities and shapes.

Nanoparticle System

The nanoparticle system can be formed of materials, compositions, devices, appliances, procedures, methods, conditions, etc. serving a common purpose of modification of surfaces (e.g., the soft surfaces, or in some cases, hard surfaces) to bring about the desired benefits. These benefits can endure multiple uses of the surface, and many include but are not limited to one or more of the following: improved surface cleaning, wettability, strike-through, comfort, stain resistance, soil removal, malodor control, modification of surface friction, reduced damage to abrasion and color enhancement properties relative to surfaces unmodified with such nanoparticle systems.

The nanoparticles, that can be used can include particles with a largest dimension (e.g., a diameter) of less than, or less than or equal to about 750 nm (nanometers). The particles that are useful herein can also include any set of particles that have a largest dimension that is less than, or less than or equal to any number which is an increment of 5 nm less than 750 nm, and in some cases may even include larger particles. Also incorporated and included herein, as if expressly written herein, are all ranges of particle sizes that are between 0 nm and 750 nm. It should be understood that every limit given throughout this specification will include every lower, or higher limit, as the case may be, as if such lower or higher limit was expressly written herein. Every range given throughout this specification will include every narrower range that falls within such broader range, as if such narrower ranges were all expressly written herein. Such particles are technologically significant since they are utilized to fabricate structures, coatings, and devices that have novel and useful properties due to the very small dimensions of their particulate constituents. Nanoparticles with particle sizes ranging from about 2 nm to about 750 nm can be economically produced. Non-limiting examples of particle size distributions of the nanoparticles are those that fall within the range from about 2 nm to less than about 750 nm, alternatively from about 2 nm to less than about 200 nm, and alternatively from about 2 nm to less than about 150 nm. It should also be understood that certain ranges of particle sizes may be useful to provide certain benefits, and other ranges of particle sizes may be useful to provide other benefits (for instance, color enhancement requires a different particle size range than the other properties). The mean particle size of various types of particles may differ from the particle size distribution of the particles. For example, a layered synthetic silicate can have a mean particle size of about 25 nanometers while its particle size distribution can generally vary between about 10 nm to about 40 nm. (It should be understood that the particle sizes that are described herein are for particles when they are dispersed in an aqueous medium and the mean particle size is based on the mean of the particle number distribution. Non-limiting examples of nanoparticles can include crystalline or amorphous particles with a particle size from about 2 to about 750 nanometers. Boehmite alumina can have an average particle size distribution from 2 to 750 nm. Nanotubes can include structures up to 1 centimeter long, alternatively with a particle size from about 2 to about 50 nanometers.

The coating composition may comprise nanoparticles; optionally a surfactant; optionally having associated to the surfaces of the nanoparticles a quantity of one or more functionalized surface molecules exhibiting properties selected from the group consisting of hydrophilic, hydrophobic and mixtures thereof; optionally one or more adjunct ingredients; a suitable carrier medium; and may form a transparent coating on a surface.

Though organic nanoparticles are common in the pharmacological arena, inorganic nanoparticles are common to consumer applications. Inorganic nanoparticles generally exist as oxides, silicates, carbonates and hydroxides. Some layered clay minerals and inorganic metal oxides can be examples of nanoparticles. The layered clay minerals suitable for use in the present invention include those in the geological classes of the smectites, the kaolins, the illites, the chlorites, the attapulgites and the mixed layer clays. Typical examples of specific clays belonging to these classes are the smectices, kaolins, illites, chlorites, attapulgites and mixed layer clays. Smectites, for example, include montmorillonite, bentonite, pyrophyllite, hectorite, saponite, sauconite, nontronite, talc, beidellite, volchonskoite and vermiculite. Kaolins include kaolinite, dickite, nacrite, antigorite, anauxite, halloysite, indellite and chrysotile. Illites include bravaisite, muscovite, paragonite, phlogopite and biotite. Chlorites include corrensite, penninite, donbassite, sudoite, pennine and clinochlore. Attapulgites include sepiolite and polygorskyte. Mixed layer clays include allevardite and vermiculitebiotite. Variants and isomorphic substitutions of these layered clay minerals offer unique applications.

Layered clay minerals may be either naturally occurring or synthetic. An example of one non-limiting embodiment of the coating composition uses natural or synthetic hectorites, montmorillonites and bentonites. Another embodiment uses the hectorites clays commercially available, and typical sources of commercial hectorites are the LAPONITEs™ from Southern Clay Products, Inc., U.S.A; Veegum Pro and Veegum F from R. T. Vanderbilt, U.S.A.; and the Barasyms, Macaloids and Propaloids from Baroid Division, National Read Comp., U.S.A.

Natural Clays—Natural clay minerals typically exist as layered silicate minerals and less frequently as amorphous minerals. A layered silicate mineral has $SiO_4$ tetrahedral sheets arranged into a two-dimensional network structure. A 2:1 type layered silicate mineral has a laminated structure of several to several tens of silicate sheets having a three layered structure in which a magnesium octahedral sheet or an aluminum octahedral sheet is sandwiched between two sheets of silica tetrahedral sheets. In some embodiments, it may be desirable for the coating composition to comprise a plurality of nanoparticles that comprise types of (or a first group of) nanoparticles other than 2:1 layered silicates. It should be understood that such a group of nanoparticles refers to the type of nanoparticles, and such nanoparticles may be distributed throughout the coating composition in any manner, and need not be grouped together. Also, even in these embodiments, the coating composition may comprise at least some (possibly a non-functional amount) of nanoparticles comprising 2:1 layered silicates (which may comprise a second group of nanoparticles).

A sheet of an expandable layer silicate has a negative electric charge, and the electric charge is neutralized by the existence of alkali metal cations and/or alkaline earth metal cations. Smectite or expandable mica can be dispersed in water to form a sol with thixotropic properties. Further, a complex variant of the smectite type clay can be formed by the reaction with various cationic organic or inorganic compounds. As an example of such an organic complex, an organophilic clay in which a dimethyldioctadecyl ammonium ion (a quaternary ammonium ion) is introduced by cation exchange and has been industrially produced and used as a gellant of a coating.

Synthetic Clays—With appropriate process control, the processes for the production of synthetic nanoscale powders (i.e. synthetic clays) does indeed yield primary particles, which are nanoscale. However, the particles are not usually present in the form of discrete particles, but instead predominantly assume the form of agglomerates due to consolidation of the primary particles. Such agglomerates may reach diameters of several thousand nanometers, such that the desired characteristics associated with the nanoscale nature of the particles cannot be achieved. The particles may be deagglomerated, for example, by grinding as described in EP-A 637,616 or by dispersion in a suitable carrier medium, such as water or water/alcohol and mixtures thereof.

The production of nanoscale powders such as layered hydrous silicate, layered hydrous aluminum silicate, fluorosilicate, mica-montmorillonite, hydrotalcite, lithium magnesium silicate and lithium magnesium fluorosilicate are common. An example of a substituted variant of lithium magnesium silicate is where the hydroxyl group is partially substituted with fluorine. Lithium and magnesium may also be partially substituted by aluminum. In fact, the lithium magnesium silicate may be isomorphically substituted by any member selected from the group consisting of magnesium, aluminum, lithium, iron, chromium, zinc and mixtures thereof.

Synthetic hectorite was first synthesized in the early 1960's and is now commercially marketed under the trade name LAPONITE™ by Southern Clay Products, Inc. There are many grades or variants and isomorphous substitutions of LAPONITE™ marketed. Examples of commercial hectorites are LAPONITE B™, LAPONITE S™, LAPONITE XLS™, LAPONITE RD™, LAPONITE XLG™, and LAPONITE RDS™. One embodiment of this invention uses LAPONITE XLS™ having the following characteristics: analysis (dry basis) $SiO_2$ 59.8%, MgO 27.2%, $Na_2O$ 4.4%, $Li_2O$ 0.8%, structural $H_2O$ 7.8%, with the addition of tetrasodium pyrophosphate (6%); specific gravity 2.53; bulk density 1.0.

Synthetic hectorites, such as LAPONITE RD™, do not contain any fluorine. An isomorphous substitution of the hydroxyl group with fluorine will produce synthetic clays referred to as sodium magnesium lithium fluorosilicates. These sodium magnesium lithium fluorosilicates, marketed as LAPONITE™ and LAPONITE S™, may contain fluoride ions of up to approximately 10% by weight. It should be understood that the fluoride ion content useful in the compositions described herein can comprise any whole or decimal numeric percentage between 0 and 10 or more. LAPONITE B™, a sodium magnesium lithium fluorosilicate, has a flat, circular plate-like shape, and may have a diameter with a mean particle size, depending on fluoride ion content, that is any number (or narrower set of numbers) that is within the range of between about 25–100 nanometers. For example, in one non-limiting embodiment, LAPONITE B ™ may be between about 25–40 nanometers in diameter and about 1 nanometer in thickness. Another variant, called LAPONITE S™, contains about 6% of tetrasodium pyrophosphate as an additive.

The ratio of the largest dimension of a particle to the smallest dimension of a particle is known as the particle's aspect ratio. The aspect ratio of the nanoparticles, in some cases, is of interest in forming films with the desired characteristics. The average aspect ratio of individual particles of LAPONITE™ B is approximately 20–40 and the average aspect ratio of individual particles of LAPONITE™ RD is approximately 10–15. In some embodiments, a high aspect ratio may be desirable for film formation using nanosized clay materials. The aspect ratio of the dispersed particles in a suitable carrier medium, such as water is also of interest. The aspect ratio of the particles in a dispersed medium can be considered to be lower where several of the particles are aggregated than in the case of individual particles. The aspect ratio of dispersions can be adequately characterized by TEM (transmission electron microscopy). LAPONITE B™ occurs in dispersions as essentially single clay particles or stacks of two clay particles. The LAPONITE RD™ occurs essentially as stacks of two or more single clay particles. Thus, the aspect ratio of the particles dispersed in the carrier medium can be affected if there is an aggregation of individual particles. In certain non-limiting embodiments, it may be desirable for at least some of (and preferably a plurality of) individual (non-aggregated) platelet and disc-shaped nanoparticles to have at least one dimension that is greater than or equal to about 0.5 nanometers, and an aspect ratio of greater than or equal to about 15. The aspect ratio of LAPONITE B™ is about 20–40 and the aspect ratio of LAPONITE RD™ is less than 15. Larger aspect ratios may be more desirable for platelet and disc-shaped particles than for rod-shaped particles. The aspect ratio of nanosized clays is significantly smaller than that of natural clays where the aspect ratio is typically greater than 250 nm for natural occurring clays.

The aspect ratio of rod-shaped particles, such as small Boehmite alumina (e.g., Disperal P2™) can be lower than the disc-shaped or platelet-shaped particles while maintaining adequate film-forming properties. In certain non-limiting embodiments, it may be desirable for at least some of (and preferably a plurality of) the individual rod-shaped nanoparticles to have at least one dimension that is greater than or equal to about 0.5 nanometers, and an aspect ratio of greater than or equal to about 3.

The aspect ratio of spheroid shaped nanoparticles is generally less than or equal to about 5. Aluminum oxide, nanolatexes, titanium dioxide and some boehmite alumina are nonlimiting examples of low aspect ratio nanoparticles. Nanoparticles preferred for the embodiments presented herein have aspect ratios of less than or equal to about 250 nm. In other non-limiting embodiments, it may be desirable for the nanoparticles to have an aspect ratio of less than about 10.

LAPONITE™, a lithium magnesium silicate has the formula:

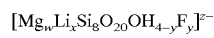

wherein w=3 to 6, x=0 to 3, y=0 to 4, z=12−2w−x, and the overall negative lattice charge is balanced by counter-ions; and wherein the counter-ions are selected from the group consisting of selected $Na^+$, $K^+$, $NH_4^+$, $Cs^+$, $Li^+$, $Mg^{++}$, $Ca^{++}$, $Ba^{++}$, $N(CH_3)_4^+$ and mixtures thereof. (If the LAPONITE™ is "modified" with a cationic organic compound, then the "counter-ion" could be viewed as being any cationic organic group (R).)

Depending upon the application, the use of variants and isomorphous substitutions of LAPONITE™ provides great flexibility in engineering the desired properties of the coating composition of the present invention. The individual platelets of LAPONITE™ are negatively charged on their faces and possess a high concentration of surface bound water. When delivered from a water or water/surfactant or water/alcohol/surfactant suitable carrier medium base matrix, the soft surface may be hydrophilically modified and may, depending on the embodiment, exhibit surprising and significantly improved surface cleaning, wettability, strike-through, comfort, malodor control, modification of surface friction, reduced damage to abrasion, and color enhancement properties. In addition, the LAPONITE™ modified surface may also exhibit soil release (stain resistance, soil removal) benefits since the top layers of the nanoparticle coating may be strippable by mild mechanical action or by chemical means.

Inorganic Metal Oxides—Inorganic metal oxides generally fall within two groups-photoactive and non-photoactive nanoparticles. General examples of photoactive metal oxide nanoparticles include zinc oxide and titanium oxide. Photoactive metal oxide nanoparticles require photoactivation from either visible light (e.g. zinc oxide) or from UV light ($TiO_2$). Zinc oxide coatings have generally been used as anti-microbial agents or as anti-fouling agents. It should be understood that photoactive nanoparticles can be used in the coating composition, and will be capable of providing benefits even if they are not photoactivated.

The inorganic metal oxides used in the composition may be silica- or alumina- based nanoparticles that are naturally occurring or synthetic. Aluminum can be found in many naturally occurring sources, such as kaolinite and bauxite. The naturally occurring sources of alumina are processed by the Hall process or the Bayer process to yield the desired alumina type required. Various forms of alumina are commercially available in the form of Gibbsite, Diaspore, and Boehmite from manufacturers such as Condea, Inc.

Boehmite alumina ($[Al(O)(OH)]_n$) is a water dispersible, inorganic metal oxide that can be prepared to have a variety of particle sizes or range of particle sizes, including a mean particle size distribution from about 2 nm to less than or equal to about 750 nm. For example, a boehmite alumina nanoparticle with a mean particle size distribution of around 25 nm under the trade name Disperal P2™ and a nanoparticle with a mean particle size distribution of around 140 nm under the trade name of Dispal® 14N4-25 are available from North American Sasol, Inc.

Non-photoactive metal oxide nanoparticles do not use UV or visible light to produce the desired effects. Examples of non-photoactive metal oxide nanoparticles include, but are not limited to: silica, zirconium oxide, aluminum oxide, magnesium oxide, and boehmite alumina nanoparticles, and mixed metal oxide nanoparticles including, but not limited to smectites, saponites, and hydrotalcite.

Inorganic metal oxide nanoparticles provide an additional benefit above those of the layered clays where concentrated sols of inorganic metal oxides can be prepared without gelling. This is particularly advantageous for applications that utilize a dilution step prior to application of the coating composition. Additionally, inorganic metal oxide nanoparticles can provide tolerance to soft water used in making nanoparticle dispersions, diluting nanoparticles dispersion compositions, and the application of nanoparticle compositions wherein the surface contains soft water ions.

Nanolatexes—A "latex" is a colloidal dispersion of water-insoluble polymer particles that are usually spherical in shape. A "nanolatex", as used herein, is a latex with particle sizes less than or equal to about 750 nm. Nanolatexes may be formed by emulsion polymerization. "Emulsion polymerization" is a process in which monomers of the latex are dispersed in water using a surfactant to form a stable emulsion followed by polymerization. Particles are produced with can range in size from about 2 to about 600 nm.

Charged Functionalized Molecules

The term "functionalize", as used herein, refers to altering the characteristics of a surface. The surface that is functionalized may be a soft surface (or substrate) that is coated with nanoparticles, or it may be the nanoparticles themselves. Functionalized molecules are molecules that provide such altering characteristics to the soft surface, to the nanoparticles, or serve to anchor or enhance adsorption onto the surfaces of the nanoparticles.

Hydrophilic modification of a soft surface (or substrate) can be augmented via use of nanoparticles such as LAPONITE™ as a basecoat or primer and then treating the negatively charged surface with functionalized charged molecules as a two-step process. Additional coatings of the nanoparticles and functionalized charged molecules can be added if desired, for example to provide alternating layers of the same in a process involving more than two steps.

Charged functionalized surface molecules may comprise at least two different types of functionalized surface molecules. Charged functionalized surface molecules may be selected from the group consisting of polymers, copolymers, surfactants and mixtures thereof. Functionalized surface molecules can also be selected from the group consisting of multi-valent inorganic salts consisting of $Ca^{+2}$, $Mg^{+2}$, $Ba^{+2}$, $Al^{+3}$, $Fe^{+2}$, $Fe^{+3}$, $Cu^{+2}$ and mixtures thereof, where an appropriate anion is used to balance the charge.

Sequential layering of LAPONITE™ and ethoxylated, quaternized oligoamines results in a reduction in the contact angles, and enhanced sheeting/wetting of the treated surface. Moreover, if the charged functionalized molecule species possess a lipophilic component, the LAPONITE treated surface can be hydrophobically modified. Net, the combination of nanoclay plus charge functionalized molecules provides a novel technique for tailoring the hydrophilic/lipophilic character of a soft surface.

Similarly, hydrophilic modification can be augmented via use of alumina as a basecoat or primer and then treating the positively charged surface with functionalized charged molecules as a two-step process. Specifically, sequential layering of alumina and hydrophilic anionic polymers results in enhanced sheeting/wetting of the treated surface. Moreover, if the charged functionalized molecule species possess a lipophilic component, the alumina treated surface can be hydrophobically modified. Net, the combination of inorganic metal oxides plus charged functionalized molecules provides a novel technique for tailoring the hydrophilic/lipophilic character of a soft surface.

I. COMPOSITION

The coating compositions of the present invention may be in any form, such as liquids (aqueous or non-aqueous), granules, pastes, powders, spray, foam, tablets, gels, and the like. Granular compositions can be in "compact" form and the liquid compositions can also be in a "concentrated" form. In one non-limiting embodiment, the coating composition may be a liquid. In other non-limiting embodiments, it may be in the form of a liquid laundry detergent.

The coating compositions can be used on all types of soft surfaces, including but not limited to woven fibers, non-woven fibers, leather, plastic, synthetic film and mixtures thereof. It should be understood that in certain embodiments, the coating composition can be applied to hard surfaces, and provide benefits thereto.

In some embodiments, the coating composition may comprise: (a) a plurality of nanoparticles, which may be an effective amount of nanoparticles; (b) optionally one or more adjunct ingredients; and (c) a suitable carrier medium. It should also be understood that the nanoparticles that are used in the various coating compositions described herein can be photoactive, nonphotoactive, or mixtures thereof, depending upon the embodiment. In these, or other embodiments, the coating composition may further comprise one or more of the following: a surfactant; one or more charged functionalized molecules exhibiting properties selected from the group consisting of hydrophilic, hydrophobic and mixtures thereof associated with at least some of the nanoparticles; or both.

Alternatively, an effective amount of nanoparticles described above are included in compositions useful for coating a variety of soft surfaces in need of treatment. As used herein, "effective amount of nanoparticles" refers to the quantity of nanoparticles necessary to impart the desired soft surface coating benefit in the specific composition. Such effective amounts are readily ascertained by one of ordinary skill in the art and is based on many factors, such as the particular nanoparticles used, the soft surface coating application, the specific composition of the soft surface coating composition, and whether a liquid or dry (e.g., granular, powder) composition is required, and the like.

An effective amount of nanoparticles, such as natural clays, synthetic clays or inorganic metal oxides, may require that at least about 0.5% of the target surface is modified to effect the desired benefits.

In one non-limiting embodiment, the coating composition is prepared by dispersing the dry nanoparticle powder into deionized water to form a 1–5% concentrated mixture. In another embodiment, the coating composition is prepared by diluting a nanoparticle gel with deionized water to form a 1–5% concentrated mixture. In another non-limiting embodiment, the coating composition is prepared by diluting a 10% concentrated boehmite alumina (e.g. Disperal P2™ or Disperal 14N4-25 from North American Sasol, Inc.) coating composition with deionized water to form a 1–5% concentrated mixture. In another non-limiting embodiment, the coating composition is prepared by diluting a 1% concentrated sodium magnesium lithium fluorosilicate (e.g. LAPONITE B™ from Southern Clay Products, Inc.) coating composition with deionized water to form a 0.1% concentrated mixture. In another non-limiting embodiment, the coating composition is prepared by diluting a 1% concentrated lithium magnesium sodium silicate (e.g. Lucentite SWN™ from Kobo Products, Inc. or LAPONITE RD™) coating composition with deionized water to form a 0.1% concentrated mixture. In another non-limiting embodiment, the coating composition is prepared by dispersing the dry nanoparticle powder into deionized water to form a 0.1% concentrated mixture. Any of these mixtures may then be applied to the surface(s) by adding the coating composition in a washing process, by spraying, dipping, painting, wiping, or by other manner in order to deliver a coating, especially a transparent coating that covers at least about 0.5% of the surface, or any greater percentage of the surface, including but not limited to: at least about 5%, at least about 10%, at least about 30%, at least about 50%, at least about 80%, and at least about 100% of the surface.

If the coating composition is to be sprayed onto the surface, the viscosity of the coating composition should be such that it will be capable of passing through the nozzle of a spray device. Such viscosities are well known, and are incorporated herein by reference. The composition can have such a viscosity when it is in an "at rest" condition, or it can have a higher viscosity at rest, and be capable of undergoing shear thinning so that it is capable of being sprayed.

An effective amount of charged functionalized surface molecules, that provide hydrophilic and/or hydrophobic properties to the nanoparticle surface, is defined as modifying from about 1% to about 100% of the nanoparticle surface or defined by weight as from about 0.01 to about 5% of the coating composition.

Several examples of various coating compositions wherein the nanoparticles may be employed are discussed in further detail below. Also, the coating compositions may include from about 0.01% to about 99.99% by weight of the coating composition of the adjunct materials.

As used herein, "coating compositions" include hand and machine applied compositions, including additive compositions and compositions suitable for use in the soaking and/or pretreatment of soft surfaces. The coating compositions and/or methods and/or articles of manufacture of the present invention are for all uses including manufacturing use, commercial and industrial use and/or domestic use.

The coating compositions of the present invention can also be used as detergent additive products in solid or liquid form. Such additive products are intended to supplement or boost the performance of conventional detergent compositions used to clean soft surfaces and can be added at any stage of the cleaning process, however addition of the coating composition to the rinsing stage is more effective. The "compact" form of the coating compositions herein is best reflected by density and, in terms of composition, by the amount of inorganic filler salt; inorganic filler salts are conventional ingredients of coating compositions in powder form. In conventional coating compositions, the filler salts are present in substantial amounts, typically 17–35% by weight of the total composition. In the compact compositions, the filler salt is present in amounts not exceeding 15% of the total composition, alternatively not exceeding 10%, alternatively not exceeding 5% by weight of the coating composition. The inorganic filler salts include, but are not limited to alkali and alkaline-earth-metal salts of sulfates and chlorides. A preferred filler salt is sodium sulfate.

Aqueous liquid, coating compositions according to the present invention can also be in a "concentrated form", in such case, the concentrated liquid coating compositions will contain a lower amount of water, compared to conventional liquid detergent compositions. Typically the water content of the concentrated liquid coating composition is alternatively less than 40%, alternatively less than 30%, alternatively less than 20% by weight of the coating composition.

The present invention comprises liquid coating compositions, alternatively aqueous liquid, coating compositions. Liquid coating compositions alternatively comprise in addition to the nanoparticles described herein, a suitable carrier medium. The carrier medium can comprise any suitable amount of the coating composition, including but not limited to from about 10% to about 99%, alternatively from about 30% to about 95%, by weight of the coating composition. Suitable carrier mediums include those, which are capable of forming a stable dispersion of the nanoparticles. Examples include, but are not limited to water, deionized water, methanol, alcohol, ethanol, acetone, and ethylene glycol, and combinations thereof.

The coating compositions may comprise one or more adjunct materials or optional ingredients. Various optional ingredients are described below. If the adjunct materials are not compatible with the other ingredients present in the coating compositions, then suitable methods of keeping the incompatible adjunct materials and the other ingredients separate (not in contact with each other) until combination of the two components is appropriate can be used. Suitable methods can be any method known in the art, such as gelcaps, encapsulation, tablets, physical separation, etc.

The coating compositions can also be used as detergent additive products in liquid form for automatic washing machines. The coating compositions, if in liquid form, may be in any suitable form, including but not limited to isotropic liquids, aqueous gels, phase-separated liquid compositions and/or colored liquid compositions. The coating compositions can also be used as detergent additive products in powder, granule, tablet, or encapsulated complex form. Such additive products may supplement or boost the performance of conventional detergent compositions and can be added at any stage of the washing process, including, but not limited to in the wash cycle, or the rinse cycle.

Suitable Carrier Medium

Suitable carrier mediums include liquids, solids and gases. One suitable carrier medium is water, which can be distilled, deionized, or tap water. Water is valuable due to its low cost, availability, safety, and compatibility. Though aqueous carrier mediums are more common than dry, non-aqueous mediums, the present invention can exist as a dry powder, granule or tablet or encapsulated complex form.

Optionally, in addition to or in place of water, the carrier can comprise a low molecular weight organic solvent. Preferably, the solvent is highly soluble in water, e.g., ethanol, methanol, propanol, isopropanol, and the like, and mixtures thereof. Low molecular weight alcohols can reduce the surface tension of the dispersion to improve wettability of the soft surface. This is particularly helpful when the soft surface is hydrophobic. Low molecular weight alcohols can also help the treated surface to dry faster. The optional water soluble low molecular weight solvent can be used at any suitable level. Several non-limiting examples, include a level of up to about 50%, or more; from about 0.1% to about 25%; from about 2% to about 15%, and from about 5% to about 10%, by weight of the total composition. Factors that need to consider when a high level of solvent is used in the coating composition are odor, flammability, dispersancy of the nanoparticles and environment impact.

Classes of Charged Functionalized Molecules

Polymer Classes and Examples

Polymers are optional ingredients in the compositions of the present invention. If desired, the compositions may be substantially free of polymers.

If polymers are used, in one non-limiting aspect of the invention, they can be used as part of a two (or more) step process. In such a process, the nanoparticle composition can be applied to the soft surface to form a layer of nanoparticles on the surface. After this layer is formed and dried, a composition comprising the desired polymers can be applied to the layer of nanoparticles to further modify the nanoparticle-coated surface. Without wishing to be bound by any particular theory, when the polymer composition is applied in this way, it is believed that the nanoparticle layer anchors the polymers to the soft surface. This can be used to provide the nanoparticle coated surface with different properties than are provided by the nanoparticles alone. Using this two-step process may provide advantages over applying the polymers to the nanoparticles and then applying the polymer coated nanoparticles to the soft surface. One advantage is that the two-step process provides a more continuous covering on the surface by virtue of the uniformity of the initial layer of nanoparticles, than the less continuous structure formed by depositing nanoparticles with polymers attached thereto onto the soft surface. Another advantage is that the durability of the polymer layer can be increased by virtue of enhanced interaction with the nanoparticle-coated surface compared to the unmodified surface.

Polymers and copolymers with at least one segment or group which comprises functionality that serves to anchor or enhance adsorption on nanoparticle surfaces may be used. These polymers may also comprise at least one segment or group that serves to provide additional character to the polymer when adsorbed on a nanoparticle. Non-limiting examples of additional character may include hydrophilic or hydrophobic properties. Note that in some cases, the anchoring segment may also serve to provide the additional character.

Examples of the anchoring segments or groups include: polyamines, quaternized polyamines, amino groups, quaternized amino groups, and corresponding amine oxides; zwitterionic polymers; polycarboxylates; polyethers; polyhydroxylated polymers; polyphosphonates and polyphosphates; and polymeric chelants.

Examples of the hydrophilizing segments or groups include: ethoxylated or alkoxylated polyamines; polyamines; polycarboxylated polyamines; water soluble polyethers; water soluble polyhydroxylated groups or polymers, including saccharides and polysaccharides; water soluble carboxylates and polycarboxylates; water soluble anionic groups such as carboxylates, sulfonates, sulfates, phosphates, phosphonates and polymers thereof; water soluble amines, quaternaries, amine oxides and polymers thereof; water soluble zwitterionic groups and polymers thereof; water soluble amides and polyamides; and water soluble polymers and copolymers of vinylimidazole and vinylpyrrolidone.

Examples of the hydrophobizing segments or groups include: alkyl, alkylene, and aryl groups, and polymeric aliphatic or aromatic hydrocarbons; fluorocarbons and polymers comprising fluorocarbons; silicones; hydrophobic polyethers such as poly(styrene oxide), poly(propylene oxide), poly(butylene oxide), poly(tetramethylene oxide), and poly(dodecyl glycidyl ether); and hydrophobic polyesters such as polycaprolactone and poly(3-hydroxycarboxylic acids).

Hydrophilic Surface Polymers

Examples of hydrophilic surface polymers include, but are not limited to: ethoxylated or alkoxylated polyamines; polycarboxylated polyamines; polycarboxylates including but not limited to polyacrylate; polyethers; polyhydroxyl materials; polyphosphates and phosphonates.

Hydrophobic Surface Polymers

Alkylated polyamines include, but are not limited to: polyethyleneimine alkylated with fatty alkylating agents such as dodecyl bromide, octadecyl bromide, oleyl chloride, dodecyl glycidyl ether and benzyl chloride or mixtures thereof; and polyethyleneimine acylated with fatty acylating agents such as methyl dodecanoate and oleoyl chloride; silicones including, but not limited to: polydimethylsiloxane having pendant aminopropyl or aminoethylaminopropyl groups and fluorinated polymers including, but not limited to: polymers including as monomers (meth)acrylate esters of perfluorinated or highly fluorinated alkyl groups.

Non-Polymeric Materials

Molecules with at least one segment or group which comprises functionality that serves to anchor or enhance adsorption on nanoparticle surfaces can also be used. These molecules also comprise at least one segment or group that serves to provide additional character to the molecule when adsorbed on a nanoparticle. Non-limiting examples of additional character may include hydrophilic or hydrophobic properties. Note that in some cases, the anchoring segment may also serve to provide the additional character.

Examples of the anchoring segments or groups that may also serve as the hydrophilizing segment include amino groups, quaternized amino groups, and corresponding amine oxides groups; zwitterionic groups; and carboxylate groups.

Examples of the hydrophobizing segments or groups include alkyl, aryl, alkaryl, siloxane, polysiloxane, fluoroether, and fluoroalkyl surfactants with cationic, zwitterionic, semi-polar, nonionic, or anionic head groups.

Examples of Non-Polymeric Surface Modifying Materials

Fatty amines and quats including: ditallowdimethylammonium chloride; octadecyltrimethylammonium bromide; dioleyl amine; and Benzyltetradecyldimethylammonium chloride can also be used.

Examples of fluorocarbon-based surfactants include: 1-propanaminium, 3-[[(heptadecafluorooctyl)sulfonyl] amino]-N,N,N-trimethyl-, iodide (9CI)

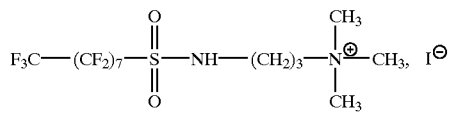

1-propanaminium, 3-[(8-chloro-2,2,3,3,4,4,5,5,6,6,7,7,8,8-tetradecafluoro-1-oxooctyl)amino]-N,N,N-trimethyl-, methyl sulfate (9CI)

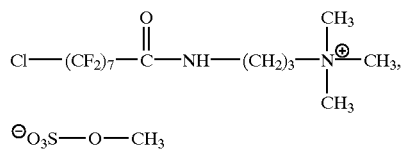

Silicone-based surfactants include: 1-propanaminium, N,N,N-trimethyl-3-[1,3,3,3-trimethyl-1-[(trimethylsilyl) oxy]disiloxanyl]-, bromide (9CI)

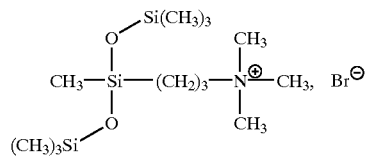

Fatty zwitterionic surfactants include: 1-dodecanaminium, N-(2-hydroxy-3-sulfopropyl)-N,N-dimethyl-, inner salt (9CI)

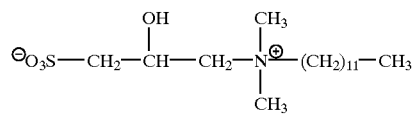

Fatty amine oxides such as hexadecyldimethylamine oxide are included. Fatty anionic surfactants include: Sodium oleyl sulfate; potassium oleate; sodium dodecylbenzenesulfonate; sodium tetradecyl sulfate; and disodium 2-hexadecenylbutanedioate.

Surfactant

Surfactants are an optional ingredient in some embodiments of the present invention. Surfactants are especially useful in the coating composition as wetting agents to facilitate the dispersion of nanoparticles onto a soft surface. Surfactants are alternatively included when the coating composition is used to treat a hydrophobic soft surface or when the coating composition is applied with in a spray dispenser in order to enhance the spray characteristics of the coating composition and allow the coating composition, including the nanoparticles, to distribute more evenly. The spreading of the coating composition can also allow it to dry faster, so that the treated material is ready to use sooner. For concentrated compositions, the surfactant can facilitate the dispersion of many adjunct ingredients such as antimicrobial actives and perfumes in the concentrated aqueous compositions.

Suitable surfactants can be selected from the group including anionic surfactants, cationic surfactants, nonionic surfactants, amphoteric surfactants, ampholytic surfactants, zwitterionic surfactants and mixtures thereof. Examples of suitable nonionic, anionic, cationic, ampholytic, zwitterionic and semi-polar nonionic surfactants are disclosed in U.S. Pat. Nos. 5,707,950 and 5,576,282. Nonionic surfactants may be characterized by an HLB (hydrophilic-lipophilic balance) of from 5 to 20, alternatively from 6 to 15.

When a surfactant is used in the coating composition, may be added at an effective amount to provide facilitate application of the coating composition and/or to provide one, or more of the benefits described herein. Typically, surfactants can be included in an amount from about 0.01% to about 60%, or more, by weight of the composition, or any amount or range within this range, including, but not limited to from about 0.01% to about 20%, and from about 0.01% to about 10%.

Nonlimiting examples of surfactants, including other nonionic surfactants, useful herein typically at levels from about 1% to about 50%, by weight, include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M^+)CH_3$ and $CH_3(CH_2)_y(CHOSO_3^-M^+)CH_2CH_3$ where x and (y+1) are integers of at least about 7, alternatively at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), the $C_{10\text{-}18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

Another class of ingredients that may be useful in the formulation of the coating compositions to solubilize and/or disperse silicone lubricants and/or silicone-containing adjunct shape retention copolymers, are silicone surfactants and/or silicones. They can be used alone and/or alternatively in combination with the preferred alkyl ethoxylate surfactants described herein above. Nonlimiting examples of silicone surfactants are the polyalkylene oxide polysiloxanes having a dimethyl polysiloxane hydrophobic moiety and one or more hydrophilic polyalkylene side chains, and having the general formula:

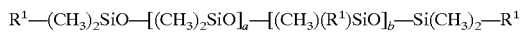

$$R^1-(CH_3)_2SiO-[(CH_3)_2SiO]_a-[(CH_3)(R^1)SiO]_b-Si(CH_3)_2-R^1$$

wherein a+b are from about 1 to about 50 alternatively, and each $R^1$ is the same or different and is selected from the group consisting of methyl and a poly(ethyleneoxide/propyleneoxide) copolymer group having the general formula:

$$-(CH_2)_nO(C_2H_4O)_c(C_3H_6O)_dR^2$$

wherein n is 3 or 4; total c (for all polyalkyleneoxy side groups) has a value of from 1 to about 100, alternatively from about 6 to about 100; total d is from 0 to about 14; alternatively d is 0; total c+d has a value of from about 5 to about 150, alternatively from about 9 to about 100 and each $R^2$ is the same or different and is selected from the group consisting of hydrogen, an alkyl having 1 to 4 carbon atoms, and an acetyl group, alternatively hydrogen and methyl group. Each polyalkylene oxide polysiloxane has at least one $R^1$ group being a poly(ethyleneoxide/propyleneoxide) copolymer group. Silicone superwetting agents are available from Dow Corning as silicone glycol copolymers (e.g. Q2-5211 and Q2-5212).

The coating compositions, if they are to be used in the automatic washing cycle can be either used along with a general detergent or actually as a rinse aid in the rinsing or pre-drying cycle. The coating compositions can comprise a nanoparticle system and optionally a surfactant or surfactant system wherein the surfactant can be selected from nonionic and/or anionic and/or cationic and/or ampholytic and/or zwitterionic and/or semi-polar nonionic surfactants.

The surfactant is alternatively formulated to be compatible with the nanoparticle system, suitable carrier medium and optional adjunct ingredients present in the coating composition.

Optional Ingredients

The coating compositions can contain other optional ingredients, including but not limited to alkalinity sources, antimicrobial preservatives, antioxidants, anti-static agents, bleaches, bleach activators, bleach catalysts, bluing agents, builders, carriers, chelating agents, aminocarboxylate chelators, colorants, color speckles, conditioners, hydrolyzable cosurfactants, dyes, dye transfer agents, dispersants, enzymes, non-activated enzymes, enzyme stabilizing systems, filler salts, fluorescers, fungicides, insect and moth repellant agents, germicides, hydrotropes, metallic salts, photoactive inorganic metal oxides, photoactive nanoparticles, organic solvents, odor-controlling materials, optical brighteners, soil release polymers, perfumes, photoactivators, polymers, preservatives, processing aids, pigments, and pH control agents as described in U.S. Pat. Nos. 5,705,464; 5,710,115; 5,698,504; 5,695,679; 5,686,014; 5,576,282; and 5,646,101, solubilizing agents, suds suppressors, surfactants, water-soluble bicarbonate salts, wetting agents, UV absorbers, zeolites, and mixtures thereof. These optional ingredients may be included at any desired level.

II. METHODS OF USE

In General

The coating compositions of the present invention can be used to modify a soft surface by applying the coating composition to the surface and optionally allowing the coating composition to dry on the surface and optionally repeating the applying and any optional drying steps as needed. Drying after the application of the coating composition is a preferred but optional step. In some embodiments of the methods described herein, including, but not limited to when applying more than one coating, it is not necessarily required to dry the coating(s) between applications.

The terms "dry" and "drying", as used herein, refer to a state or process in which a liquid coating composition has less free water or liquid than when the coating composition was applied. These terms may also include any of the following states in which: the surface coated with the coating composition is dry to the touch; the coating is at equilibrium under the laboratory conditions specified in the Test Methods section; there is no excess water in the coating above the amount of water which is present at the coating's 40° C./100% relative humidity water regain threshold; and the coating is "bone dry", although these degrees of drying are not required unless specified.

The coating compositions can be applied to the surface in any suitable manner. The coating compositions can be applied to the surface when the surface is at least partially immersed in a bath of the coating composition (immersive processes), or without immersing the surface in the coating composition (non-immersive processes). The specific methods used include, but are not limited to the following: (1) applying the coating composition directly, or indirectly, to the surface(s); (2) applying the coating composition to the surface(s) during a process of washing the surface(s); and (3) applying the coating composition to the surface(s) during a process of rinsing the surface(s). In addition, the coating composition can be applied during another type of process that is being carried out on the surface, such as a process of bleaching, cross-linking, etc. a material comprising a soft surface.

Distribution of the coating composition can be achieved by using a wide variety of application methods and devices, including but not limited to: spray devices, immersion containers, printers, washing machines, spray hose attachments, rollers, pads, etc. In other non-limiting embodiments, the composition can be applied in a spray tunnel (or other suitable manner), such as in a fabric manufacturing facility, a garment manufacturing facility, a professional dry cleaning and/or laundering establishment. In other non-limiting embodiments, the composition may be applied in an enclosed space, such as a cabinet, or the like, by an individual. The coatings, coating compositions, methods, and articles of manufacture described herein can be used in all types of operations and situations including, but not limited to: manufacturing (including, but not limited to textile and/or garment manufacturing and post manufacturing treatments), commercial (including, but not limited to dry cleaning or laundering operations), industrial, institutional, agricultural, and domestic situations. The application method and devices chosen will often depend on the manner of delivering or applying the coating composition to the soft surface(s).

Optional Step of Enhancing the Ability of the Surface to Receive the Coating Composition In any of the embodiments of the method described herein, it may be desirable to perform a step of preparing the soft surface(s) in some suitable manner to enhance the ability of the surface to receive the coating composition. For example, it may be desirable to alter or change, such as by increasing, the surface energy of the soft surface(s). This is particularly true in the case of fibrous soft surfaces that are hydrophobic or borderline hydrophilic.

Hydrophobic or borderline hydrophilic soft surfaces include, but are not limited to materials such as knitted, woven, and nonwoven materials that are comprised of hydrophobic or borderline hydrophilic structural components. The structural components of a knitted, woven, or nonwoven material may comprise yarns, strands, fibers, threads, or other structural components. Some or all of the structural components may be hydrophobic, borderline hydrophilic, or combinations thereof. Hydrophobic structural components are those that entirely comprise a hydrophobic material, or partially comprise a hydrophobic material on the surface (such as a multi-component fiber comprising a core of one or more materials partially or fully surrounded by a hydrophobic sheath). Similarly, borderline hydrophilic structural components are those that entirely comprise a borderline hydrophilic material or partially comprise a borderline hydrophilic material on the surface. If a structural component includes both hydrophobic materials and borderline hydrophilic materials on the surface, then it is considered hydrophobic. Hydrophobic materials are often synthetic polymers, co-polymers, blends, or combinations thereof. Examples include but are not limited to polyolefins such as polypropylene and polyethylene, and to certain polyesters such as polyethylene terepthalate (PET), and to certain polyamides. Borderline hydrophilic materials are also often synthetic polymers, co-polymers, blends, or combinations thereof. Examples include but are not limited to polyamides and polyesters which exhibit borderline hydrophilicity. Polyesters with borderline hydrophilicity include the class of polyesters which have recently been termed hydrophilic polyesters. One example is PET/branched polyethylene glycol (branched PEG) co-polymers such as the T870, T289, and T801 grades available from Wellman, Inc., Charlotte, N.C., USA. Another example is polyesters with aliphatic repeat units instead of some or all of the aromatic repeat units of PET. Polylactide (or polylactic acid or PLA) polymers available from Cargill Dow Polymers, LLC, Blair Nebr. contain aliphatic repeat units.

The ability of the surface to which the coating composition is applied to receive the coating composition can be enhanced in a non-limiting number of different ways.

As discussed herein, one way of enhancing the ability of the surface of the material to receive the coating composition is through the use of surfactants. Surfactants reduce the surface tension of water-based nanoparticle dispersions, thereby improving wettability of the soft surface. Wetting the surface is important because it allows the dispersion to carry the nanoparticles across a greater surface area thereby increasing coverage.

While surfactants may work well for many applications, in the case of some of the hydrophobic or borderline hydrophilic materials described above, presence of residual surfactant from the coating process may be particularly problematic when the material is subsequently rewetted during use, such as in articles which transport fluid including but not limited to textiles, absorbent articles and disposable absorbent articles such as diapers and other incontinence and catamenial products such as feminine pads, that are subject to one or more gushes of liquid during use (e.g., urine, menses, sweat, or other body exudates). Liquid gushes wash the residual surfactant from the soft surface into the liquid phase itself during use. Even low levels of residual surfactant in the liquid phase reduce the surface tension of the liquid. Reduced surface tension in the liquid phase lowers its wicking tension along the fibers (surface tension X cosine of the contact angle). Lower wicking tension reduces the wicking velocity and, in turn, the wicking flux through or along the porous fabric (amount of fluid per unit time per unit cross sectional area). Reduced wicking flux can result in lower fluid handling performance to the end user.

Reduced surface tension in the liquid phase also increases its ability to wet fabric surfaces which are intentionally hydrophobic. Once a formerly hydrophobic fabric is wetted, it can begin exhibiting hydrophilic behavior. A hydrophobic surface which otherwise would have repelled a fluid such as water can pass the fluid through or along the fabric via wicking tension force, gravitational force, pressure gradient force, or other forces. One example is an SMS barrier leg cuff of a diaper through which pure urine cannot easily pass in use. The reduced surface tension of urine contaminated with residual surfactant enables wetting and subsequent passage through said SMS fabric. This can result in the perception of leakage by the end user.

An alternative to reducing fluid surface tension for the purposes of improving the extent to which nanoparticulate dispersions wet a soft surface is to increase surface energy of the soft surface. Therefore, in certain embodiments, the surface energy of the surface can be increased by applying certain high energy surface treatment to the material to form a treated surface. High energy surface treatment can include, but is not limited to: corona discharge treatment, plasma treatment, UV radiation treatment, ion beam treatment, electron beam treatment, certain laser treatments including pulsed lasers, and other irradiative techniques, provided the surface energy of a portion of some of the fibers is increased. Care is taken to avoid adversely affecting the material to be treated. In some cases, it may be desirable for some of these treatments to be applied to both sides of a soft surface. In addition, it is contemplated that this optional step may be a separate, pre-treatment step from the application of the coating composition to the soft surface, or these two steps may be combined.

High energy surface treatments which increase surface energy are useful in that in combination with the nanoparticles they can provide the surface with durable hydrophilic properties. In turn, increased surface energy increases the wettability of the soft surface without use of surfactants in the dispersion to achieve wetting. Avoiding use of surfactant is useful for reasons previously discussed. In a non-limiting example, corona treatment places transient charges on fibrous thermoplastic surfaces. As discussed earlier, partial or full charges dissipate over time, and maintaining partial or full charges on fibrous thermoplastic surfaces is a common limitation. However, it has been found that corona treatment in combination with the nanoparticles can be used to place a durable charge on the material so that water continues to be attracted to the material after time elapses. The use of nanoparticles in conjuction with high energy surface treatments, can convert the transient properties of such treatments to more durable properties. In a non-limiting example, corona treatment of a 13 gram per square meter hydrophobic SMS polypropylene nonwoven subsequently treated with a nanoparticulate dispersion and dried exhibited consistently fast strikethrough following multiple insults. Without wishing to be bound by theory, the corona treatment increased the surface energy fo the fiber. The nanoparticle dispersion without a surfactant was brought into contact with the fiber surfaces before the charges could dissipate.

The higher surface energy enabled the dispersion to wet the fibrous surfaces better than would have been possible without the corona treatment. On the surfaces which are wetted, the nanoparticles associate with the partial or full charge on the surface which would otherwise be transient. This association may take the form of a van der Waals interaction or the form of some other interaction or bond. The nanoparticles are sufficiently small to render the associations sufficient strong to withstand multiple strikethroughs. The nanoparticle is sufficiently large to resist rotation away from oxygen into the polymer or dissipate in general as previously discussed. The nanoparticles need the high energy surface treatment to enable wetting without a surfactant and provide uniform deposition on drying; the high energy surface treatment needs the nanoparticles to render a durably charged surface.

The materials that have been subjected to a high energy surface treatment and have a plurality of nanoparticles deposited thereon can be suitable for a great many uses including, but not limited to use to transport liquid in articles such as clothing containing hydrophobic or borderline hydrophilic fibers and in portions of disposable absorbent articles. Said portions of disposable absorbent articles include but are not limited to topsheets, acquisition layers, distribution layers, wicking layers, storage layers, absorbent cores, absorbent core wraps and containment structures.

In some embodiments, the liquid strike-through time of a material treated in such a manner is less than or equal to about 10 seconds, preferably less than or equal to about 6 seconds, more preferably less than or equal to about 3 seconds, after 3 gushes of test liquid, or any higher number of liquid insults, including but not limited to after 5 gushes of test liquid, and after 10 gushes of test liquid, when tested in accordance with the Strike-Through Test in the Test Methods section.

The materials that have been treated with the coating composition described herein for the purpose of rendering them hydrophilic, regardless of whether they have been subjected to the high energy surface treatment, may be made to have advancing contact angles with water of less than or equal to, or less than 90°, or any number of degrees less than 90, including but not limited to 45°, after 30 seconds of spreading.

In alternative embodiments, other methods can be used to enhance the ability of the surface of the material to receive the coating composition. These include, but are not limited to: providing a pressure gradient on the material (including, but not limited to through the use of pressure rolls, printing rolls, nip rolls, hydrostatic pressure, etc.); reducing the surface tension of the coating composition on the surface without using a surfactant (e.g., such as by using ethanol instead of a surfactant); through the use of "degradable" or "cleavable" surfactants; and, as described in greater detail below, by inkjet printing of the composition on the material.

Cleavable surfactants are materials with weak chemical bonds built into the molecule, typically between the hydrophilic head group and hydrophobic tail. This bond is easily broken by a variety of chemical treatments, generating two or more molecular species/fragments that are no longer surface active. Such chemical treatments include but are not limited to: acid, alkali, oxidation, heat and UV. The use of cleavable surfactants eliminates need for high energy pre-treatments such as corona discharge and plasma, and eliminates concerns relating to surface tension reduction of liquid medium that comes into contact with the nanoparticle composition. Recent articles exemplifying different types of cleavable surfactants include Hellberg et al, Journal of Surfactants and Detergents, Volume 3, Issue 1, 2000. Cleavable surfactants include, but are not limited to: surfactants susceptible to alkaline hydrolysis including esters of quaternized ethanolamines and sugar esters and monoalkylcarbonates; surfactants susceptible to acid hydrolysis including alkylglucosides, 1,3-dioxolane and 1,3-dioxane surfactants, non-cyclic acetal containing surfactants and alkyl ortho esters; and, surfactants susceptible to photocleavage including alkylarylketone sulfonates and diazosulfonate containing surfactants.

The surface may also be referred to herein as the "substrate". Without wishing to be bound by any particular theory or characterization, in some embodiments, the treatments, etc. referred to herein that enhance the ability of the surface to receive the coating composition can be thought of as serving as a "primer" for the surface. The nanoparticle coating may, in some embodiments, be thought of as an aqueous dispersion containing an active material (the nanoparticles). When the coating dries, it leaves an active distribution of nanoparticles on the surface. Again, without wishing to be bound by any particular theory or characterization, in some embodiments, both the primer and the nanoparticles may be interdependent. The nanoparticles distributed on the surface can, in some embodiments, serve to "lock in" the properties of the primer so that such properties are less transient in character, and the primer more effectively allows the nanoparticles to bond to the surface.

(1) Direct or Indirect Application

There are a non-limiting number of embodiments of methods which use direct or indirect application of the coating composition to the soft surface(s). The term "direct application", as used herein, refers to a method of applying the coating composition directly to the soft surface. Direct application may, for example, include, but is not limited to spraying the coating composition directly on the soft surface (s). The term "indirect application", as used herein, refers to applying the coating composition to some other article, which applies the coating composition to the soft surface(s). Indirect application may, for example, include, but is not limited to applying the coating composition onto a roll, which applies the coating composition onto the soft surface (s).

In one non-limiting embodiment, an effective amount of the liquid coating composition of the present invention is alternatively sprayed onto soft surfaces and/or soft surface articles that include, but are not limited to: clothes, draperies, towels, upholstery, carpet, paper, books, leather, natural and synthetic fibers, etc. When the coating composition is sprayed onto a soft surface, an effective amount of the nanoparticles may be deposited onto the soft surface, with the soft surface becoming damp or totally saturated with the coating composition. Applying the coating composition to a surface such as a soft surface by spraying can provide a number of benefits. The coating composition can, if desired: be targeted to a particular area of the article to which it is applied; only be applied to one side of an article (as opposed to immersion processes); and can be more efficient in that more of the nanoparticles will end up on the surface rather than being washed down a drain in a washing or rinsing process.

The coating composition can also be applied to a surface such as a soft surface via a dipping and/or soaking process in an immersion container followed by an optional drying step. The application can be performed by large-scale processes on soft surfaces and/or finished articles in an industrial application, or in a consumer's home.

The present invention also comprises methods of using concentrated liquid or solid coating compositions, which are diluted to form compositions with the usage concentrations, as given hereinabove, for use in the "usage conditions". Concentrated compositions comprise a higher level of nanoparticle concentration, which may include, but are not limited to from about 0.1% to about 50%, alternatively from about 0.5% to about 40%, alternatively from about 1% to about 30%, by weight of the concentrated coating composition.

Concentrated compositions are used in order to provide a less expensive product. The concentrated product is alternatively diluted with 1,000 parts carrier medium, alternatively 100 parts carrier medium, and alternatively 10 parts carrier medium by weight of the coating composition.

In another non-limiting embodiment, the coating composition can be applied to the soft surface(s) by printing the coating composition onto the soft surface(s). Any suitable printing technology can be used for this purpose including, but not limited to: transfer printing such as rotary, gravure, and flexographic printing, and ink jet printing. Inkjet printing is of particular interest because the relatively high inertial force of the small droplets is capable of distributing the coating composition along the substrate surface(s) temporarily enhancing the ability of the coating composition to wet the soft surface(s). The low thermal mass of the droplets enables rapid evaporation of the carrier medium, typically beginning in about 0–10 seconds, preferably in about 0.1 to 1 second or less. The carrier medium begins evaporating before the surface tension of the droplet can fully recover from being spread following impact. The nanoparticles remain where the dispersion had wet the surface prior to evaporation of the carrier medium. Ink jet printing of nanoparticle dispersions as described is beneficial on hydrophobic surfaces, borderline hydrophilic surfaces, and on surfaces in which the advancing contact angle is substantially greater than the receeding contact angle.

The coating composition can be produced in a relatively low viscosity diapersion (e.g., less than about 10 centipoise when needed, preferably less than about 5 centipoise) so that it will flow through the ink jet nozzles and across the surface with less flow resistance than if the viscosity were higher. Unlike conventionally sized particles in conventional dispersions, nanoparticles are sufficiently small that they will not settle in the low viscosity medium and they will not clog the nozzles of the inkjet printer. Any suitable type of inkjet printing technology can be used including, but not limited to drop on demand ink jet printers such as drop vaporization type with oscillating heating elements and drop ejection type with mechanical pump and oscillating crystal. In some embodiments, soft surfaces, and other articles can be moved through or past the ink jet printing nozzles. In other embodiments, such as in the case of hard surfaces, the ink jet printer can be configured to move relative to the surface.

(2) Application During a Washing Process

In other non-limiting embodiments, the coating composition can be applied to a surface, such as a soft surface during a washing process. The washing process may include, but is not limited to a commercial or domestic wash process. In such embodiments, the coating composition can be applied in a washing machine, or by some other suitable application method. The coating composition can be introduced into the washing process in any suitable manner, including but not limited to with a detergent or as a separate tablet, gel, or liquid. The coating composition can provide any suitable concentration of nanoparticles in the wash solution, including but not limited to less than or equal to about 0.02% (or 200 ppm), and lesser concentrations including but not limited to 0.01% (100 ppm). If the soft surface is washed (or rinsed) more than once, in some embodiments, it may be possible for the quantity of nanoparticles on the surface to accumulate and build up on the surface.

(3) Application During a Rinsing Process

In other non-limiting embodiments, there is a provided a method of using a liquid coating composition alternatively a concentrated liquid coating composition for treating soft surfaces, such as fabrics, during a rinsing operation, such as in the rinse step of an automatic washing machine. The rinse water may contain any suitable amount of nanoparticles, including, but not limited to from about 0.0005% to about 1%, alternatively from about 0.0008% to about 0.1%, alternatively from about 0.001% to about 0.05% of the nanoparticles.

Another method comprises the treatment of soft surfaces with a coating composition according to the present invention dispensed from a sprayer at the end of the rinse cycle just before beginning the drying cycle. It is preferable that the treatment is performed in accordance with the instructions for use, to ensure that the consumer knows what benefits can be achieved, and how best to obtain these benefits.

Additional Uses/Benefits

The coating composition can, as noted herein, provide the soft surface with a color enhancement (or color care) benefit. Soft surfaces to which a color enhancement benefit can be provided include, but are not limited to garments, fabrics, textiles, carpets, upholstery, and other soft surfaces. The application of nanoparticles to such articles has surprisingly been found to provide a visible color rejuvenation benefit. The nanoparticles can provide a significant enhancement of the color of worn garments and other soft surfaces as well as provide a prevention of fabric color loss. The nanoparticles may also provide protection from fading due to exposure to UV light. The enhancement of the color often takes the form of a visible darkening of faded colors. The color enhancement benefit can be measured using a Hunter Miniscan XE instrument available from Hunter Associates Laboratory, Reston, Va., USA.

Without wishing to be bound by any particular theory, it is believed that the color enhancement benefit may be due to the attenuation of light that reaches the soft surface and is reflected from the soft surface back to the observer.

The level of color enhancement benefit may depend on a number of factors including, but not limited to particle size, refractive index of the particles, the amount of nanoparticles deposited on the soft surface, particle shape, particle orientation on the surface, and the light absorption properties of the particles.

Without wishing to be bound by any particular theory, it is believed that the color enhancement benefit may be provided by at least two distinct types of structures formed by the nanoparticles on the surface. These are believed to depend on the size of the nanoparticles. In at least some embodiments that utilize nanoparticles that have a mean particle size of greater than or equal to about 100 nanometers, it is believed that the nanoparticles will form a distribution of nanoparticles on the surface. In such embodiments, these relatively larger nanoparticles deposited on the surface are believed to be capable attenuating light even if they have been deposited in an amount covering less than about 100% of the surface. In other non-limiting embodiments, at least a portion of at least some of the color regions has nanoparticles having a mean particle size of less than or equal to about 100 nanometers deposited thereon in an amount covering greater than or equal to about 25% of the surface.

In many embodiments, it may be desirable for the nanoparticles to have a mean particle size distribution that is less than or equal to about 750 nanometers. In some embodiments, it may be desirable for the nanoparticles to have a refractive index of greater than or equal to about 1.3. In some embodiments, it may be desirable for the nanoparticles to have a refractive index of less than or equal to about 5.5. The refractive index of the nanoparticles can be measured using the bulk nanoparticle material or a thin film of the bulk material using ellipsometery.

It has been found that, in some embodiments, the darkening of the soft surface generally increases with increasing particle sizes. Of course, the particles used should not be so large that they are visible on the soft surface. Particles comprised of different materials will have different color enhancement properties. For example, in embodiments in which a color enhancement benefit is sought and particles of boehmite alumina are used, it may be desirable for the nanoparticles to have a mean particle size distribution that is about 140 nanometers.

Nanoparticles that can provide a color enhancement benefit include, not only non-photoactive nanoparticles, but also passified photoactive nanoparticles. The term "passified photoactive nanoparaticles" are photoactive nanoparticles that have been rendered less reactive to light. Passified photoactive nanoparticles may, for example, comprise photoactive nanoparticles that have been coated with a nonreactive barrier component. Nanoparticles that have been found to provide a color enhancement benefit include, but are not limited to: boehmite alumina, aluminum oxide, silicalite (e.g., ZSM-5), and nanolatexes. Nanoparticles that have been found to provide protection from fading include, but are not limited to: LAPONITE B™, coated UV absorbers such as $TiO_2$ coated with silica and alumina, and ZnO.

The coating composition can be applied to soft surfaces to provide a color care benefit in any suitable manner. Suitable manners for applying the coating composition to soft surfaces to provide a color care benefit include, but are not limited to direct application including, but not limited to by spraying, applying during the wash cycle of a washing process (that is, "through the wash"), and applying in the rinse cycle of a washing process (that is, "through the rinse"). Direct application and application through the rinse may be more desirable, since they may provide better deposition of some types of nanoparticles on the soft surface (s).

The coating composition may, in some embodiments, be applied so that after the coating composition dries, the nanoparticles cover greater than or equal to about 0.5% of the surface area of the soft surface. The percentage of deposition can be measured using the X-Ray Fluorescence (XRF) test described in the Test Methods section.

The color enhancement benefit can be measured using the L, a, and b (unit-less scales of a Hunter Miniscan XE device. In some embodiments, the nanoparticles may provide a change in any one or more of the L, a, and b values versus an untreated material that is greater than the absolute value of about 0.25. The percentage of reflectance can also be measured using the Hunter Miniscan device. In some embodiments, the nanoparticles may reduce the total reflectance relative to an untreated sample by about 1% for any wavelengths between 380 nanometers and 700 nanometers.

In any of the embodiments described herein, or in other embodiments, the nanoparticle coating can be utilized in a process that comprises stripping at least one layer of nanoparticles from the coating on a treated soft surface using mechanical or chemical means to remove foreign matter (i.e. soil, spotting residues, food etc.) from the treated surface. The mechanical or chemical means does not exclude the washing or optionally the normal use of the surface (e.g., wear of an article of clothing that comprises the soft surface). Not to be limited by theory, it is believed that the strippable-film mechanism of this method is depicted in FIGS. 1–3.

Figure 2:
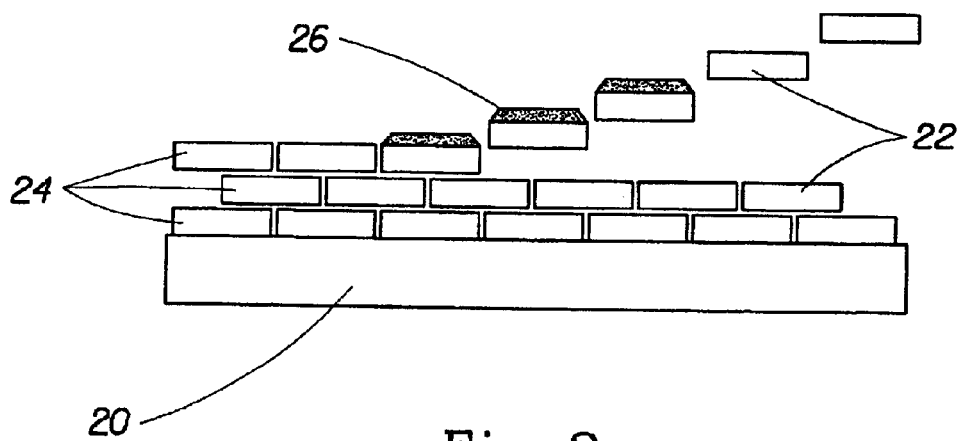
FIG. 2 is a schematic side view similar to FIG. 1, only showing how the removal of the top layer of nanoparticles may remove the soil deposited on the coating.
Figure 3:
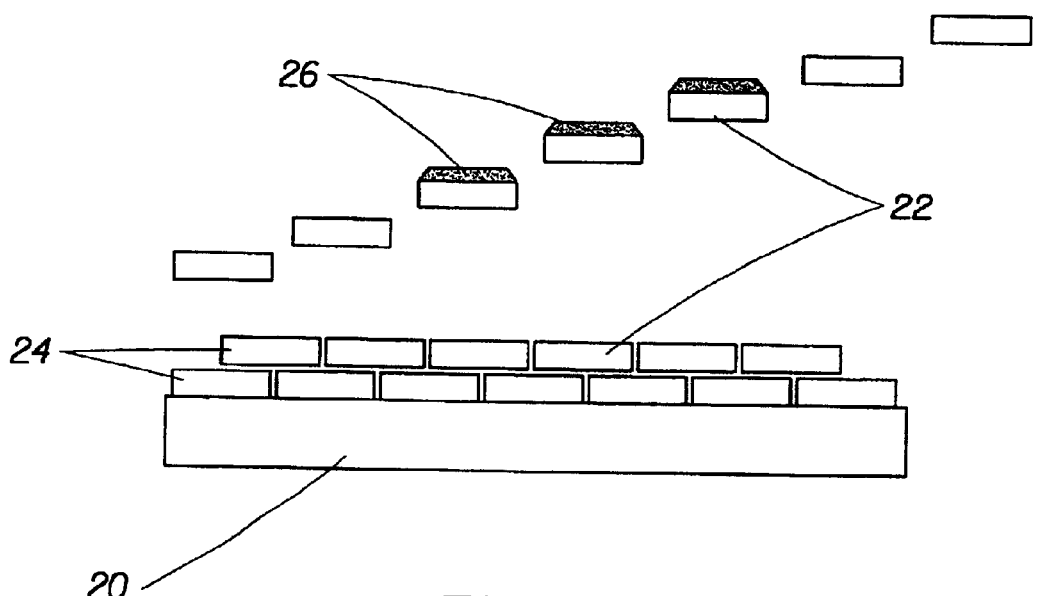
FIG. 3 is a schematic side view similar to FIGS. 1 and 2 showing a further step in the removal process.

In FIGS. 1–3, the soft surface is designated by reference number 20. The individual nanoparticles are designated by reference number 22, and the layers formed thereby are designated by reference number 24. The soil or stain deposited on the nanoparticles is designated by reference number 26. In one embodiment of the present invention, such as in a laundering application, an effective amount of a nanoparticle coating is deposited as an invisible film, preventing stains from setting into the soft surface or fabric 20 (FIG. 1). The nanoparticle coating may comprise multiple effective layers 24 of nanoparticle sheets that provide the benefit. During the wash process or stripping treatment, at least one top layer 24 of the nanoparticle coating is removed, taking the stain 26 along with it (FIGS. 2 and 3).

III. ARTICLES OF MANUFACTURE

The present invention also relates to an article of manufacture comprising the coating composition of the present invention in a package. The coating composition may be provided in association with instructions for how to use the coating composition to treat soft surfaces such that the soft surfaces are modified, in order to obtain at least one of the desirable results described herein.

In one non-limiting embodiment, the article of manufacture comprises the composition in a spray dispenser, in association with instructions for how to use the coating composition to treat soft surfaces correctly, including, e.g., the manner and/or amount of composition to spray, and the preferred ways of applying the coating composition, as will be described with more detail herein below. It is important that the instructions be as simple and clear as possible, which includes using pictures and/or icons where desirable.

Spray Dispenser

The coating composition may be placed into a spray dispenser in order to be distributed onto the hard surface. The spray dispenser can be any of the manually activated types for applying the coating composition to small hard surface areas and/or a small number of substrates, as well as non-manually operated, powered sprayers for conveniently applying the coating composition to large hard surface areas and/or a large number of substrates. The spray dispenser can include, but are not limited to any of the following: aerosol spray dispensers, self-pressurized spray dispensers, non-aerosol, manually activated, pump-spray dispensers, manually-activated trigger-spray dispensers, trigger sprayers or finger pump sprayers, non-manually operated spray dispensers including, but not limited to, powered sprayers, air aspirated sprayers, liquid aspirated sprayers, electrostatic sprayers, and nebulizer sprayers. Powered sprayers can include, but are not limited to, centrifugal or positive displacement designs. Powered sprayers are readily available from suppliers such as Solo, Newport News, Virginia (e.g., Solo Spraystar™ rechargeable sprayer, listed as manual part #: US 460 395). Certain types of sprayers, including, but not limited to electrostatic sprayers, may cause fewer suds or bubbles to be introduced into the treating composition during application to the surface, which form suitable coatings with less visible residue under a wider variety of conditions. This may allow a wider range of surfactants to be used in the coating composition.

It is preferred that the powered sprayer be powered by a portable DC electrical current from either disposable batteries (such as commercially available alkaline batteries) or rechargeable battery units (such as commercially available nickel cadmium battery units). Powered sprayers can also be powered by standard AC power supply available in most buildings. The discharge nozzle design can be varied to create specific spray characteristics (such as spray diameter and particle size). It is also possible to have multiple spray nozzles for different spray characteristics. The nozzle may or may not contain an adjustable nozzle shroud that would allow the spray characteristics to be altered.

Electrostatic sprayers impart energy to the aqueous coating composition via a high electrical potential. This energy serves to atomize and charge the aqueous coating composition, creating a spray of fine, charged particles. As the charged particles are carried away from the sprayer, their common charge causes them to repel one another. This has two effects before the spray reaches the target. First, it expands the total spray mist. This is especially important when spraying to fairly distant, large areas. The second effect is maintenance of original particle size. Because the particles repel one another, they resist collecting together into large, heavier particles like uncharged particles do. This lessens gravity's influence, and increases the charged particle reaching the target. As the mass of negatively charged particles approach the target, they push electrons inside the target inwardly, leaving all the exposed surfaces of the target with a temporary positive charge. The resulting attraction between the particles and the target overrides the influences of gravity and inertia. As each particle deposits on the target, that spot on the target becomes neutralized and no longer attractive. Therefore, the next free particle is attracted to the spot immediately adjacent and the sequence continues until the entire surface of the target is covered. Hence, charged particles improve distribution and reduce drippage.

Nonlimiting examples of commercially available electrostatic sprayers appears in U.S. Pat. No. 5,222,664, Noakes, issued Jun. 29, 1993; U.S. Pat. No. 4,962,885, Coffee, issued Oct. 16, 1990; U.S. Pat. No. 2,695,002, Miller, issued Nov. 1954; U.S. Pat. No. 5,405,090, Greene, issued Apr. 11, 1995; U.S. Pat. No. 4,752,034, Kuhn, issued Jun. 21, 1988; U.S. Pat. No. 2,989,241, Badger, issued Jun. 1961. Electrostatic sprayers are readily available from suppliers such as Tae In Tech Co, South Korea and Spectrum, Houston, Tex.

The article of manufacture may comprise a combination of a non-manually operated sprayer and a separate container of the aqueous coating composition, to be added to the sprayer before use and/or to be separated for filling/refilling. The separate container can contain a usage composition, or a concentrated composition to be diluted before use, and/or to be used with a diluting sprayer, such as with a liquid aspirated sprayer, as described above.

The separate container may have structure that mates with the rest of the sprayer to ensure a solid fit without leakage, even after motion, impact, etc. and when handled by inexperienced consumers. The sprayer desirably can also have an attachment system that is safe and alternatively designed to allow for the liquid container to be replaced by another container that is filled. For example, a filled container can replace the fluid reservoir. This can minimize problems with filling, including minimizing leakage, if the proper mating and sealing means are present on both the sprayer and the container. Desirably, the sprayer can contain a shroud to ensure proper alignment and/or to permit the use of thinner walls on the replacement container. This minimizes the amount of material to be recycled and/or discarded. The package sealing or mating system can be a threaded closure (sprayer) which replaces the existing closure on the filled and threaded container. A gasket is desirably added to provide additional seal security and minimize leakage. The gasket can be broken by action of the sprayer closure. These threaded sealing systems can be based on industry standards. However, it is highly desirable to use a threaded sealing system that has non-standard dimensions to ensure that the proper sprayer/bottle combination is always used. This helps prevent the use of fluids that are toxic, which could then be dispensed when the sprayer is used for its intended purpose.

An alternative sealing system can be based on one or more interlocking lugs and channels. Such systems are commonly referred to as "bayonet" systems. Such systems can be made in a variety of configurations, thus better ensuring that the proper replacement fluid is used. For convenience, the locking system can also be one that enables the provision of a "child-proof" cap on the refill bottle. This "lock-and-key" type of system thus provides highly desirable safety features. There are a variety of ways to design such lock and key sealing systems.

Care must be taken, however, to prevent the system from making the filling and sealing operation too difficult. If desired, the lock and key can be integral to the sealing mechanism. However, for the purpose of ensuring that the correct recharge or refill is used, the interlocking pieces can be separate from the sealing system. E.g., the shroud and the container could be designed for compatibility. In this way, the unique design of the container alone could provide the requisite assurance that the proper recharge/refill is used.

The present invention also relates to an article of manufacture comprising a coating composition for use in spraying and/or misting an entire soft surface or article in a manner such that excessive amounts of the coating composition are prevented from being released to the open environment, provided in association with instructions for use to ensure that the consumer applies at least an effective amount of nanoparticle system and/or coating composition, to provide the desired soft surface multi-use benefit.

Product with Instructions for Use

The present invention also encompasses the inclusion of instructions on the use of the coating compositions of the present invention with the packages containing the coating compositions herein or with other forms of advertising associated with the sale or use of the coating compositions. The instructions may be included in any manner typically used by consumer product manufacturing or supply companies. Examples include providing instructions on a label attached to the container holding the coating composition; on a sheet either attached to the container or accompanying it when purchased; or in advertisements, demonstrations, and/or other written or oral instructions which may be connected to the purchase or use of the coating compositions.

Specifically the instructions will include a description of the use of the coating composition, for instance, the recommended amount of composition to use in order to coat the surface or article; the recommended amount of composition to apply to the surface; if spraying, soaking or rubbing is appropriate.

The coating compositions can be included in a product. The product can comprise the coating composition together with instructions for using the product to launder soft surfaces by contacting a soft surface in need of treatment with an effective amount of the coating composition such that the coating composition imparts one or more desired the, soft surface coating benefits to the soft surface.

The following examples are illustrative of the present invention, but are not meant to limit or otherwise define its scope. All parts, percentages and ratios used herein are expressed as percent weight unless otherwise specified.

Even though the compositions and methods of the present invention are focused on domestic modification of soft surfaces, the compositions and methods of the present invention can be used for industrial modification of soft surfaces, such as in textile mills.

EXAMPLES

TABLE 1

Example 1–13
Liquid soft surface coating compositions, according to the present invention, are prepared as follows, where the balance is water:

| Example # | Nanoparticle (Wt %) | Surfactant (Wt %) |
|---|---|---|
| 1 | LAPONITE B ™ (0.1) | Neodol 91-6 (0.075) |
| 2 | LAPONITE B ™ (0.05) | Neodol 91-6 (0.075) |
| 3 | LAPONITE B ™ (0.05) | Silwet L-77 (0.025) |
| 4 | LAPONITE RD ™ (0.1) | Neodol 91-6 (0.075) |
| 5 | LAPONITE RD ™ (0.05) | Neodol 91-6 (0.075) |
| 6 | LAPONITE RD ™ (0.05) | Silwet L-77 (0.025) |
| 7 | LAPONITE RD ™ (0.1) | — |
| 8 | LAPONITE B ™ (0.1) | — |
| 9 | Disperal 14N4-25 (1%) | — |
| 7 | LAPONITE RD ™ (1) | — |
| 8 | LAPONITE B ™ (1) | — |
| 10 | Disperal 14N4-25 (1%) | — |
| 11 | Disperal 14N4-25 (1%) | Neodol 91-6 (0.075) |
| 12 | Disperal 14N4-25 (4%) | Neodol 91-6 (0.075) |
| 13 | 1% ZSM5 | |

1. LAPONITE B ™ is sodium magnesium lithium fluorosilicate from Southern Clay Products, Inc.
2. LAPONITE RD ™ is sodium magnesium lithium silicate from Southern Clay Products, Inc.
3. ZSM5 is a nanosized zeolite with a particle size from 70 to about 400 nm.

TABLE 2

Examples 14–15
Liquid coating compositions, according to the present invention, are prepared as follows:

| | Formula 14 (Wt %) | Formula 15 (Wt %) |
|---|---|---|
| LAPONITE ™ | 0.5 | 1.0 |
| $C_{13-15}$ EO7 ethoxylated surfactant | 20 | |
| $C_{12-14}$ amineoxide surfactant | 5 | |
| HLAS | | 20 |
| Citric acid | 6 | |
| $C_{12-18}$ fatty acid | | 15 |
| Diethylene triamine pentamethylene phosphonic acid | 0.4 | |
| Hydroxyethanedimethylenephosphonic acid | 0.45 | |
| Ethoxylated polyethylene imine | 2.65 | |
| Boric acid | 2 | |
| $CaCl_2$ | 0.02 | 0.02 |
| Propanediol | 18 | 20 |
| Ethanol | 1 | |
| Monoethanolamine | to pH 8.5 | |
| NaOH | | to pH 8.5 |
| Protease enzyme | 0.77 | |
| Amylase enzyme | 0.06 | 0.06 |
| Cellulase enzymes | 0.16 | 0.16 |
| Nanoparticle system | 1.0 | 2.5 |
| Water | to 100 parts | to 100 parts |

1. LAPONITE ™ is lithium magnesium silicate from Southern Clay Products, Inc.

TABLE 3

Examples 16–19
Laundry Rinse Additive Compositions
Liquid coating compositions, according to the present invention, are prepared as follows:

| Component Wt % | 16 | 17 | 18 | 19 |
|---|---|---|---|---|
| TEA Di-ester quat1 | 30 | 30 | 45 | 45 |
| Ethanol (from softener active) | 2.5 | 2.5 | 3.7 | 3.7 |
| Hexylene glycol (from softener active) | 2.7 | 2.7 | 4.0 | 4.0 |
| Hexylene glycol | 6 | 6 | — | 10 |
| TMPD | — | — | 10 | — |
| Neodol ® 91-82 | 4.5 | 4.5 | — | — |
| Tergitol 15S93 | — | — | 2.6 | 2.6 |
| $CaCl_2$ | — | — | 0.75 | 0.75 |
| $MgCl_2$ | 1.5 | 1.5 | — | — |
| DTPA4 | — | 0.2 | — | — |
| Ammonium chloride | 0.1 | 0.1 | — | — |
| TPED5 | — | — | 0.2 | 0.2 |
| Perfume | 2.5 | 2.5 | 2.5 | 2.5 |
| LAPONITE RD ™ | 0.15 | 0.25 | 0.5 | 0.15 |
| De-ionized water | Balance | Balance | Balance | Balance |

1 LAPONITE RD ™ is a sodium magnesium lithium silicate from Southern Clay Products, Inc.
2 Di(acyloxyethyl)(2-hydroxyethyl)methyl ammonium methyl sulfate where the acyl group is derived from partially hydrogenated canola fatty acid.
3 Ethoxylated alkyl alcohol, trademarked by Shell.
[4]Ethoxylated alkyl alcohol, trademarked by Union Carbide
5 Diethylene triamine pentaacetate
6 Tetrakis-(2-hydroxypropyl)ethylenediamine

TABLE 4

Examples 20–21
Granular coating compositions, according to the present invention, are prepared as follows:

| | Example 20 | Example 21 |
|---|---|---|
| Nanoparticle | | |
| LAPONITE RD ™ | 0.25 | 0 |
| Lucentite SWN ™ | 0 | 0.25 |
| Builders | | |
| Zeolite | 21.53 | 21.53 |
| Sodium Carbonate (total) | 33.12 | 33.12 |
| SKS6 | 4.50 | 4.50 |
| Silicate (2R) | 0.12 | 0.12 |
| Polymer | | |
| Acrylic acid/maleic acid copolymer | 2.43 | 2.43 |
| CMC | 0.15 | 0.15 |
| Surfactants | | |
| LAS | 9.95 | 9.95 |
| Cationic Surfactant | 1.99 | 1.99 |
| Bleach | | |
| PB4 | 9.0 | 9.0 |
| TAED | 1.63 | 1.63 |
| HEDP (60%) | 0.21 | 0.21 |
| MgSO4 | 0.41 | 0.41 |
| EDDS | 0.18 | 0.18 |
| Enzymes | | |
| Savinase (13 KNPU) | 0.45 | 0.45 |
| Termamyl (130 KNU/g) | 0.14 | 0.14 |
| Carezyme (1000s CEVU/g) | 0.19 | 0.19 |
| Sud Suppressors | | |
| Silicone Suds Suppressor | 1.17 | 1.17 |

TABLE 4-continued

Examples 20–21
Granular coating compositions, according to
the present invention, are prepared as follows:

| | Example 20 | Example 21 |
|---|---|---|
| Aesthetics/Misc | | |
| STS | 1.0 | 1.0 |
| Soap | 0.75 | 0.75 |
| Sodium Sulphate | 22.24 | 22.24 |

1. LAPONITE RD ™ is a sodium magnesium lithium silicate from Southern Clay Products, Inc.
2. Lucentite SWM ™ is lithium magnesium sodium silicate from Kobo Products, Inc.

Strike through results for SMS polypropylene nonwoven materials (13 grams per square meter) exposed to a Laboratory Corona Treater (Model# BD-20AC, manufactured by Electro-Technic Products Inc., USA) and coating compositions according to the present invention are reported in Table 5.

TABLE 5

Strike Through Times

| | Strike Through Time (seconds) | | |
|---|---|---|---|
| Sample | 1st Insult | 2nd Insult | 3rd Insult |
| 0.2% Laponite RD (Southern Clay Products) | 2.5 | 2.8 | 2.8 |
| 0.1% Disperal P2 (Condea) | 1.6 | 2.3 | 2.4 |

TABLE 6

Color Enhancement with Nanoparticles

| | Green #41 | | | Maroon #47 | | | Black Polyester | | |
|---|---|---|---|---|---|---|---|---|---|
| Sample | ΔL | Δa | Δb | ΔL | Δa | Δb | ΔL | Δa | Δb |
| Disperal P2[a] | −1.4 | −1.4 | 0.2 | −1.0 | 0.4 | 0.9 | −0.4 | 0.0 | 0.2 |
| Dispal 14N4-25[a] | −1.9 | −2.1 | 0.2 | −2.8 | 4.0 | 0.2 | −2.0 | 0.0 | 0.6 |
| Dispal 11N7-12[a] | −1.0 | −1.3 | −0.4 | −1.7 | 2.8 | −0.6 | −2.2 | 0.0 | 0.2 |
| Nanotek ® Aluminum Oxide[b] | −1.8 | −1.6 | 0.1 | −3.0 | 3.1 | −0.2 | −1.5 | 0.1 | 0.1 |
| ZRYS4[c] | −1.4 | −1.7 | 0.4 | −1.4 | 1.6 | 0.7 | −0.6 | −0.1 | 0.2 |
| AL20[c] | −2.0 | −3.2 | 0.3 | −1.0 | 2.0 | 0.3 | −0.6 | −0.1 | 0.2 |
| ZSM5 | −1.7 | −0.3 | 0.4 | −1.3 | 1.3 | 0.6 | −1.7 | −0.1 | 0.7 |
| Laponite B ™[d] | −0.6 | −1.2 | −0.3 | −1.7 | 2.0 | 0.2 | −0.6 | −0.2 | 0.3 |

[a]Sasol North America Inc.
[b]Nanophase Technologies Corporation
[c]Nyacol Nanotechnologies, Inc.
[d]Southern Clay Products

TABLE 7

UV-Induced Color Change of Cotton Fabrics (Hunter Miniscan ΔE[1])

| Treatment | Pink | Purple | White |
|---|---|---|---|
| A. Untreated | 1.3 | 2.4 | 7.8 |
| B. TiO₂ (Altair, 300 nm) | 1.1 | 2.8 | 5.9 |
| C. ZnO (Nanophase, >250 nm) | 1.6 | 1.6 | 9.7 |
| D. Alumina (Sasol, 140 nm) | 1.1 | 2.5 | 8.6 |
| E. Laponite B (SCP, 25 nm) | 1.0 | 1.8 | 7.2 |

TABLE 7-continued

UV-Induced Color Change of Cotton Fabrics (Hunter Miniscan ΔE[1])

| Treatment | Pink | Purple | White |
|---|---|---|---|

Bold values distinguish samples with significantly less fading than untreated fabric.
[1]ΔE is common miniscan output ($\Delta E = [(\Delta L)^2 + (\Delta a)^2 + (\Delta b)^2]^{1/2}$)

Table 8. Deposition of Boehmite Alumina through the rinse.

A single cycle represents a wash in Liquid TIDE® laundry detergent available from The Procter & Gamble Company, Cincinnati, Ohio, USA at 6 gpg (grains per gallon) water hardness (Ca:Mg=3:1) and 100 ppm of boehmite alumina added in the rinse step of the wash cycle with ULTRA DOWNY® fabric softener also available from The Procter & Gamble Company. The amount of the boehmite alumina deposited on fabric was determined for white cotton (CW-11 obtained from Empirical Manufacturing Company, Inc. (or EMC)) of 7616 Reinhold Drive, Cincinnati, Ohio 45237, USA, by the XRF method. Color measurements were determined on cotton (CW-11) fabrics dyed with fabric dyed green (dye: CAS # 128-58-5) obtained from Empirical Manufacturing Company. Delta "L", "b", and "a" values represent the change in untreated vs treated fabrics (Δvalue= treated−untreated), where more negative values represent a larger color enhancement benefit.

| | 1 Cycle | 5 Cycles |
|---|---|---|
| Amount Deposited (mg of Boehmite/gram of fabric) | 2.3 | 2.9 |

-continued

| | 1 Cycle | 5 Cycles |
|---|---|---|
| ΔL | −0.5 | 0.0 |
| Δa | −0.1 | −0.5 |
| Δb | 0.0 | 0.2 |

TEST METHODS

Unless otherwise stated, all tests are performed under standard laboratory conditions (50% humidity and at 73° F. (23° C.)).

Contact Angle

Dynamic contact angles are measured using the FTA200 Dynamic Contact Angle Analyzer, made by First Ten Angstroms, USA. A single drop of test solution is dispensed onto the sample substrate. A digital video recording is made while the drop spreads out across the surface of the substrate and the FTA200 software measures the contact angle of the liquid with the substrate as a function of time.

Liquid Strike-Through Test

The liquid strike through time is measured using Lister-type strike-through equipment, manufactured by Lenzing AG, Austria. Test procedure is based on standardized EDANA (European Disposables And Nonwovens Association) method 150.3-96, with the test sample placed on an absorbent pad comprised of ten plies of filter paper (Ahlstrom Grade 632 obtained from Empirical Manufacturing Co., Inc., or equivalent). In a typical experiment, three consecutive 5 ml gushes of test liquid (0.9% saline solution) are applied to a nonwoven sample at one minute intervals and the respective strike-through times are recorded without changing the absorbent pad.

Color Enhancement Test

Fabric sample swatches are obtained. The standard fabric set includes: green cotton (dye: CAS # 128-58-5), maroon cotton (dye: CAS # 27165-25-9), pink cotton (dye: CAS # 128-58-5), purple cotton (long sleeved t-shirt: Old Navy, 11711 Princeton Rd., Springdale, Ohio 45246, SKU #165578600028) black polyester (Ponte double knit polyester fabric, Jo-Ann Fabric & Crafts, 10214 Colerain Ave., Bevis, Ohio 45251, SKU #864-595), and PW19 (obtained from Empirical Manufacturing Co. The green, maroon, and pink cotton fabrics were dyed with the specified dye according to the procedure outlined in reference *Journal of the Society of Dyers and Colourists*, Vol. 12, October 1996, pg 287–293. The nanoparticles are applied from a 1% active (the composition contains 1% nanoparticles with the balance being water and/or other ingredients) aqueous solution (neutralized (the pH is adjusted with NaOH or HCl to achieve a solution pH of about 6) using a Solo® sprayer, in the amount of 100% fabric weight to give a loading amount of 10 mg/g fabric. Swatches are line dried, and color change is measured using a Hunter Miniscan XE device (C/2°, where C is the type of illuminant and 2° is the observation angle). The Hunter Miniscan XE device is calibrated and operated according to the operating manual supplied by the manufacturer.

Color Fade Protection Test

A composition comprising 0.5% aqueous dispersion of nanoparticles is directly applied to the fabric at a loading capacity of 5 mg active (mg of nanoparticles)/g fabric. The fabric is then air-dried. Following this, the fabric is subjected to 10 hours of UV exposure in a Weather-Ometer device obtained from R. B. Atlas Inc., 9 Canso Road Toronto, Ontario M9W 4L9 Canada in accordance with AATCC (American Association of Textile Colorists and Chemists) Test Method 16E. After exposure to UV in the Weather-Ometer device, the L, a, and b values are measured with a Hunter Miniscan XE device (C/2°) according to the manual supplied by the manufacturer. ΔE values are calculated. ΔE values for treated substrates that are less than the ΔE value for the untreated substrates demonstrate color fade protection.

X-Ray Fluorescence Analysis

X-Ray Fluorescence (XRF) is a nondestructive and non-invasive technique that assesses the concentration of elements in a sample or on the surface of a sample. The analysis is performed using a Phillips Analytical PW2404 Sequential "4000W" X-Ray Spectrometer System, Serial No. DY735 obtained from Phillips Analytical12 Michigan Dr. Natick, Mass. 01760, USA. The instrument settings and specifications for XRF analysis are set out in Table 9 below.

Measurement Procedure:
1) Calibration curves that relate instrument response to analyte concentration can be constructed by pipetting known concentrations of standards on the desired substrate. Standards are allowed to slowly dry before measurements are performed.
2) The standard or sample is assayed by placing the sample face down in a sample cup, loading the sample cup into the spectrometer, and initiating the data acquisition sequence. In the case of synthetic hectorite coatings, the element lines for Mg and Si are measured whereas the element line for Al is used for aluminum oxide coatings.
3) Concentration for samples are determined from the calibration curve for standards.

TABLE 9

| General conditions for X-Ray Fluorescence Test | |
| --- | --- |
| Sample Chamber Environment | Vacuum |
| Detector type | Goniometer |
| Element line assayed | Kα1 for desired element |
| Sample Spinner | On |
| Tube Type | Rhodium |

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the subject invention have been described, it will be obvious to those skilled in the art that various changes and modifications of the subject invention can be made without departing from the spirit and scope of the invention. It is intended to cover, in the appended claims, all such modifications that are within the scope of the invention.

What is claimed is:

1. A method of rendering a material hydrophilic, said method comprising the steps of:
   (a) providing a material comprised of hydrophobic or borderline hydrophilic components;
   (b) increasing the surface energy of said material via an irradiation technique; and
   (c) applying a plurality of nanoparticles to said material having an increased surface energy,
   wherein the material having said nanoparticles applied is capable of absorbing bodily exudates and is hydrophilic.

2. The method of claim 1 wherein said material comprises a textile such as a nonwoven material comprised of hydrophobic or borderline hydrophilic structural components.

3. The method of claim 2 wherein at least some of the structural components of said material are at least partially comprised of a polyolefin.

4. The method of claim 3 wherein at least some of the structural components of said material are at least partially comprised of polyethylene.

5. The method of claim 3 wherein at least some of the structural components of said material are at least partially comprised of polypropylene.

6. The method of claim 1 wherein the step of increasing the surface energy of said material is performed by a treatment selected from the group consisting of corona discharge treatment; plasma treatment; UV radiation; ion beam treatment; electron beam treatment; laser treatment; and combinations thereof.

7. The method of claim 1 wherein said nanoparticles are selected from the group consisting of non-photoactive nanoparticles, photoactive nanoparticles, passified photoactive nanoparticles, and combinations thereof.

8. The method of claim 1 wherein after step (c), the surface of the treated material becomes hydrophilic having an advancing contact angle with water of less than 90° after 30 seconds of spreading.

9. The method of claim 1 wherein said material having said nanoparticles applied is used in an article that is selected from the group consisting of diapers, incontinence products, and catamenial products.

10. The method of claim 1 wherein said components are selected from the group consisting of topsheets, acquisition layers, distribution layers, wicking layers, storage layers, absorbent cores, absorbent core wraps, containment structures, and combinations thereof.

11. The method of claim 1 wherein the material with nanoparticles applied thereto is a nonwoven textile which exhibits a liquid strike-through time less than or equal to about 10 seconds after three 5 mL gushes of a test liquid according to a Strike Through Test.

12. The method of claim 1 wherein the material with nanoparticles applied thereto is a nonwoven textile which exhibits a liquid strike-through time less than or equal to about 6 seconds after three 5 mL gushes of a test liquid according to a Strike Through Test.

13. The method of claim 1 wherein the material with nanoparticles applied thereto is a nonwoven textile which exhibits a liquid strike-through time less than or equal to about 3 seconds after three 5 mL gushes of a test liquid according to a Strike Through Test.

* * * * *